(12) United States Patent
Boucher

(10) Patent No.: US 9,657,950 B2
(45) Date of Patent: May 23, 2017

(54) COLLAPSIBLE COOKING DEVICE

(76) Inventor: Paul Michael Boucher, Stillwater, MN (US)

( * ) Notice: Subject to any disclaimer, the term of this patent is extended or adjusted under 35 U.S.C. 154(b) by 225 days.

(21) Appl. No.: 13/456,713

(22) Filed: Apr. 26, 2012

(65) Prior Publication Data

US 2012/0204852 A1    Aug. 16, 2012

Related U.S. Application Data

(60) Provisional application No. 61/489,965, filed on May 25, 2011.

(51) Int. Cl.
*A47J 33/00* (2006.01)
*F24C 1/16* (2006.01)
*A47J 37/07* (2006.01)

(52) U.S. Cl.
CPC ............. *F24C 1/16* (2013.01); *A47J 37/0763* (2013.01)

(58) Field of Classification Search
CPC ......... A47J 37/0763; F24B 3/00; F23R 23/28; F23M 5/00; F23C 99/00; F23C 15/00; F23D 14/12
USPC ......... 126/30, 65, 9 R, 155.2, 9 B, 29, 25 T; 220/4.28, 4.31
See application file for complete search history.

(56) References Cited

U.S. PATENT DOCUMENTS

| | | | |
|---|---|---|---|
| 808,766 A | | 1/1906 | Lehmann et al. |
| 1,238,142 A | * | 8/1917 | Hitchcock ...................... 126/29 |
| 2,164,835 A | | 7/1939 | Pearson et al. |
| 2,300,842 A | | 11/1942 | Freeland et al. |
| 2,424,665 A | | 7/1947 | Pope |
| 2,698,646 A | * | 1/1955 | Hepworth ...................... 126/204 |
| 2,920,614 A | * | 1/1960 | Phelps ......................... 126/25 B |
| 3,109,420 A | * | 11/1963 | Ott et al. ....................... 126/9 R |
| 3,384,066 A | * | 5/1968 | Tufts ............................... 126/9 R |
| 3,447,530 A | | 6/1969 | Santeramo |
| 3,858,495 A | | 1/1975 | Gotwalt |
| 3,884,214 A | * | 5/1975 | Duncan ....................... 126/25 B |
| 3,892,222 A | | 7/1975 | Darbo |
| 4,069,806 A | | 1/1978 | Landry |
| 4,211,206 A | * | 7/1980 | Darbo ............................ 126/9 R |
| 4,212,288 A | * | 7/1980 | Lipinski ......................... 126/628 |
| 4,508,096 A | | 4/1985 | Slattery |
| 4,531,505 A | | 7/1985 | Hait et al. |

(Continued)

OTHER PUBLICATIONS

Slatgrills http://www.slatgrills.com.

(Continued)

*Primary Examiner* — Avinash Savani
*Assistant Examiner* — Rabeeul Zuberi
(74) *Attorney, Agent, or Firm* — William Mitchell IP Clinic

(57) ABSTRACT

A fire-resistant collapsible enclosure can include three or more sidewalls coupled with a cross plate internal to the enclosure. A top portion of the enclosure can include a non-linear edge configured to be an airflow outlet, or a bottom portion of the enclosure can include a non-linear edge configured to be an airflow outlet. The fire-resistant collapsible enclosure can be configured for use as an oven, a stove, or a smoker. In an example, two or more of the fire-resistant collapsible enclosures can be used together, such as where one enclosure is configured as a heat source and a second enclosure is configured as a smoker. In an example, the cross plate can include a throttle to control airflow through the enclosure.

16 Claims, 28 Drawing Sheets

(56) References Cited

U.S. PATENT DOCUMENTS

| | | | |
|---|---|---|---|
| 4,548,192 A | 10/1985 | Hsu | |
| 4,569,327 A * | 2/1986 | Velten | 126/25 A |
| 4,807,802 A * | 2/1989 | Williams | B65D 81/365 |
| | | | 217/12 R |
| 4,971,045 A * | 11/1990 | Probst | 126/65 |
| 4,996,970 A * | 3/1991 | Legare | 126/205 |
| 5,105,726 A * | 4/1992 | Lisker | 99/340 |
| 5,137,010 A * | 8/1992 | Whitfield et al. | 126/173 |
| 5,243,961 A | 9/1993 | Harris | |
| 5,566,961 A * | 10/1996 | Snell | A47B 31/00 |
| | | | 220/4.31 |
| 5,575,195 A | 11/1996 | Foxford | |
| 5,711,210 A * | 1/1998 | Kaufman | 99/340 |
| 5,713,344 A | 2/1998 | Gilbert | |
| 5,785,046 A | 7/1998 | Colla | |
| 5,801,362 A | 9/1998 | Pearlman et al. | |
| 5,915,371 A | 6/1999 | Hering | |
| 6,035,768 A * | 3/2000 | Kaufman | 99/449 |
| 6,314,955 B1 * | 11/2001 | Boetcker | 126/9 R |
| 6,591,828 B1 | 7/2003 | Schneider | |
| 6,681,757 B1 | 1/2004 | Rivero | |
| 6,708,604 B1 | 3/2004 | Deichler, Jr. | |
| 6,823,858 B1 | 11/2004 | Chen | |
| 6,845,769 B2 | 1/2005 | Chen | |
| 6,883,512 B2 * | 4/2005 | Esposito | 126/9 R |
| 6,995,340 B1 | 2/2006 | Ho | |
| 7,934,494 B1 * | 5/2011 | Schneider | 126/241 |
| 8,028,689 B2 * | 10/2011 | Bruno | 126/25 R |
| 2003/0146653 A1 * | 8/2003 | Butler | B63B 29/04 |
| | | | 297/440.1 |
| 2004/0261480 A1 * | 12/2004 | Giesy | C05F 17/0205 |
| | | | 71/8 |
| 2008/0230043 A1 * | 9/2008 | Bruno | 126/25 B |

OTHER PUBLICATIONS

Solid Fuel Burner http://zenstoves.net/SolidFuelBurner.htm.
Honey Stove http://www.itstactical.com/gear/honey-stove-the-bees-knees-of-backpacking-stoves/.
Esbit Stove http://www.hikinghq.net/stoves/esbit.html.
A Simple Esbit Stove for Backpacking http://www4.gvsu.edu/triert/bpack/esbit/esbit_stove.htm.
Modified Esbit Stove http://www.backpacking.net/makegear/mod-esbit/.
Make Your Own Solid Fuel Stove http://www.backpacking.net/makegear/stove5/.
Nimblewill Nomad's Little Dandy Wood Stove (6± oz.) http://www.nimblewillnomad.com/stove.htm.
Esbit http://www.esbit.net/.
Littlbug Enterprises http://www.littlbug.com/.
Magic-Flame Next-Generation http://www.kuenzi.com/home_e.
Outreq Wilderness Cooker http://www.outreq.com/html/wk15.html.
How to Choose a Camp Stove http://artofmanliness.com/2012/03/22/how-to-choose-a-camp-stove/.

* cited by examiner

COLLAPSIBLE COOKING DEVICE

PRIORITY CLAIM AND RELATED APPLICATIONS

This application claims the benefit under 35 U.S.C. 119(e) of the following U.S. Provisional Patent Application, the contents of which is incorporated herein by reference in its entirety: U.S. Provisional Patent Application Ser. No. 61/489,965 filed May 25, 2011.

TECHNICAL FIELD

The present disclosure relates generally to heating devices, and more particularly to portable, collapsible heating devices.

BACKGROUND

In developing nations and elsewhere, meals are regularly prepared over open, wood-fueled fires. In some places, expanding populations can diminish wood fuel supplies, or the cost of wood fuel can be prohibitively high. In some regions, it can cost a significant portion of one's annual earnings just to purchase wood for cooking, or one may need to hike a great distance just to collect wood.

Collapsible stoves have been used in these developing nations and other regions to contain cooking heat and to efficiently prepare meals. In some instances, a collapsible portable stove can be used outdoors, such as for preparing food while camping.

Collapsible portable stoves can use various fuel types as a heat source. For example, some fuel types include foraged branches, twigs, or chunks of wood, wood pellets, paper products, charcoal, flammable liquids or gasses, jellied alcohol fuels, or other solid fuels such as fuel tablets or waxes.

SUMMARY

The present disclosure describes a portable heating device that can controllably consume or burn a fuel source. The heating device can improve heat output efficiency or concentrate heat energy on a food or other product being heated or prepared. The heating device can be portable, efficient, durable, light-weight, and economical to manufacture using common manufacturing techniques.

The portable heading device can include a collapsible portable stove comprising a first and a second pair of substantially rectangular side plates. One of the side plates can include a port that can extend from an edge of a particular side plate toward an opposite edge of the particular side plate. The collapsible portable stove can include a cross member. One of the pairs of side plates can include a slot in each plate, and the slot can be configured to receive the cross member, and the slot can extend from an edge of each plate of the pair toward an opposite edge of each plate of the pair. Each of the side plates can include a first mating feature disposed near a first side edge portion of each plate and a second mating feature disposed near an opposite side edge portion of each plate. Each pair of the side plates can be configured to matingly engage with the other pair of side plates using the mating features.

The portable heading device can include a fire-resistive apparatus comprising a fire-resistant collapsible enclosure and a cross plate. The fire-resistant collapsible enclosure can include, among other things, substantially vertical sidewalls, a bottom support portion of a sidewall of the enclosure, and a top support portion of a sidewall of the enclosure. The bottom support portion can include a non-linear edge configured to be an airflow inlet. The top support portion can include an airflow outlet. The cross plate can be coupled with the substantially vertical sidewalls at an intermediate location between the top and bottom support portions. The airflow inlet and the airflow outlet can be in fluid communication and can be configured to control airflow through the enclosure. In an example, the apparatus can be configured for use as a heating apparatus, such as for preparing meals.

The portable heading device can include a fire-resistant collapsible stove assembly comprising a pair of substantially rectangular planar male side plates, and a pair of substantially rectangular planar female side plates. Each of the side plates can include, among other things, a bottom portion with a substantially horizontal non-linear bottom edge, a top portion with a substantially horizontal non-linear top edge, and first and second side portions with substantially vertical side edges. The first and second side portions of each of the male side plates can include a male coupling feature, and the first and second side portions of each of the female side plates can include a female coupling feature. The male and female coupling features can be configured to correspondingly engage. In an example, the fire-resistant collapsible stove assembly can include one of a throttle plate assembly or a fire grate. The throttle plate assembly or the fire grate can include extensions on opposite ends of the throttle plate assembly or fire grate. The extensions can be configured to engage with slots that can be formed in one of the pair of male side plates or the pair of female side plates. In an example, the slots can be located intermediately between the top and bottom edges of the pair of side plates.

The portable heading device can include a fire-resistant collapsible enclosure comprising several substantially flat plates, such as three or more sidewall plates and at least one cross plate. The enclosure can be easily and quickly assembled, and can be configured for use as a stove, an oven, or a smoker. In some examples, multiple enclosures can be connected together to provide different, connected chambers for combustion and cooking or smoking, such as can be used to prepare "smoked" foods. The enclosure can be easily disassembled and reassembled. In a disassembled state, the enclosure's flat plates can be stacked and stored compactly. In a particular example, the enclosure can weigh about two pounds.

One or more support members can be coupled to a top portion of one or more of the sidewalls to provide a cooking surface or to provide support for other cooking apparatuses. For example, a cross bar can be coupled to a top edge of two or more sidewalls, such as to provide support for a cooking pan or cup. In an example, food can be placed directly on a grill grate coupled to a top edge of the sidewalls. Various features, such as cutouts, slots, or tabs, among others, can be provided in the sidewalls or support members to ensure a secure connection between the sidewalls and support members.

This summary is intended to apprise the reader of the general content of the present invention and is not intended to limit the scope of the invention in any way.

BRIEF DESCRIPTION OF THE DRAWINGS

These as well as other objects and advantages of the invention will be more completely understood and appreciated by referring to the following detailed description in conjunction with the accompanying drawings, wherein.

Figure 1A:
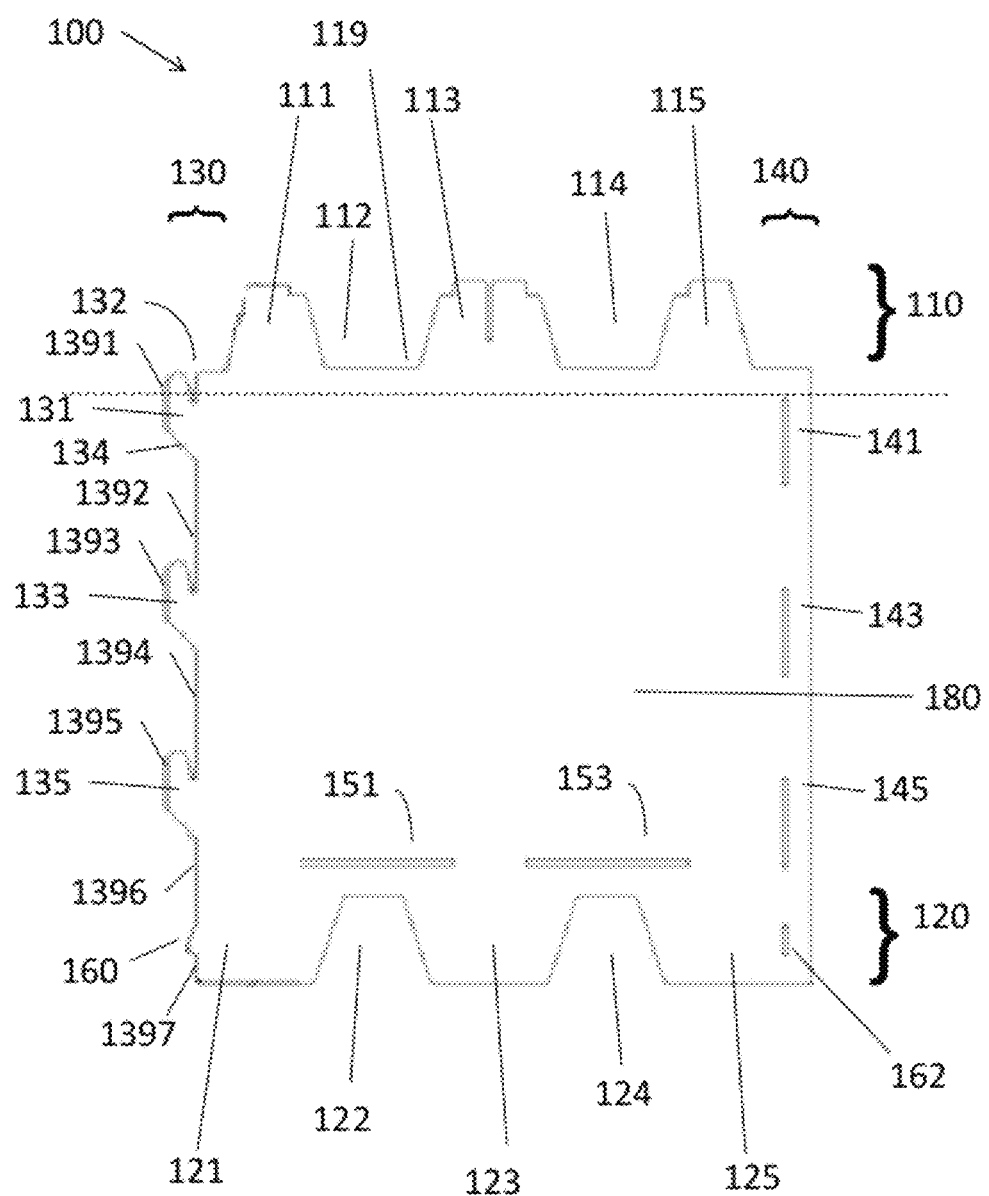
FIG. 1A is a side view of a sidewall plate.

While the invention is amenable to various modifications and alternative forms, specifics thereof have been shown by way of example in the drawings and will be described in detail. It should be understood, however, that the intention is not to limit the invention to the particular embodiments described or illustrated. The invention covers all modifications, equivalents, and alternatives.

DETAILED DESCRIPTION

In this document, the term "or" is used to refer to a nonexclusive "or", unless otherwise indicated. For example, where "or" is used to join two or more elements, it is to be understood that the elements can be used individually or in combination. That is, "X or Y" can refer to X or Y individually, or to both X and Y. In addition, unless otherwise indicated, the terms "first," "second," "third," etc. are used throughout this document merely as labels for their objects.

A fire-resistant collapsible enclosure can be configured for use as a stove or an oven, such as can be used for preparing food or heating other objects. The enclosure can include three or more substantially rectangular, coupled sidewalls, and can optionally include a cross plate that can be disposed inside the enclosure. A top portion of the enclosure can include a non-linear edge configured to be an airflow port (e.g., an airflow inlet or airflow outlet), or a bottom portion of the enclosure can include a non-linear edge configured to be an airflow port (e.g., an airflow inlet or airflow outlet). In this document, a "port" refers to any opening for either intake or exhaust of gaseous or particulate matter.

The sidewalls of the enclosure can include several features that enable multiple sidewalls to be coupled, and other features that can enable controlled consumption of a fuel source disposed inside the enclosure. For example, FIG. 1A illustrates generally a side view of a first side plate 100 that can be used as a sidewall of a fire-resistant collapsible enclosure. The first side plate 100 can include a top support portion 110, a bottom support portion 120, a male side portion 130, a female side portion 140, and a body portion 180.

Figure 1B:
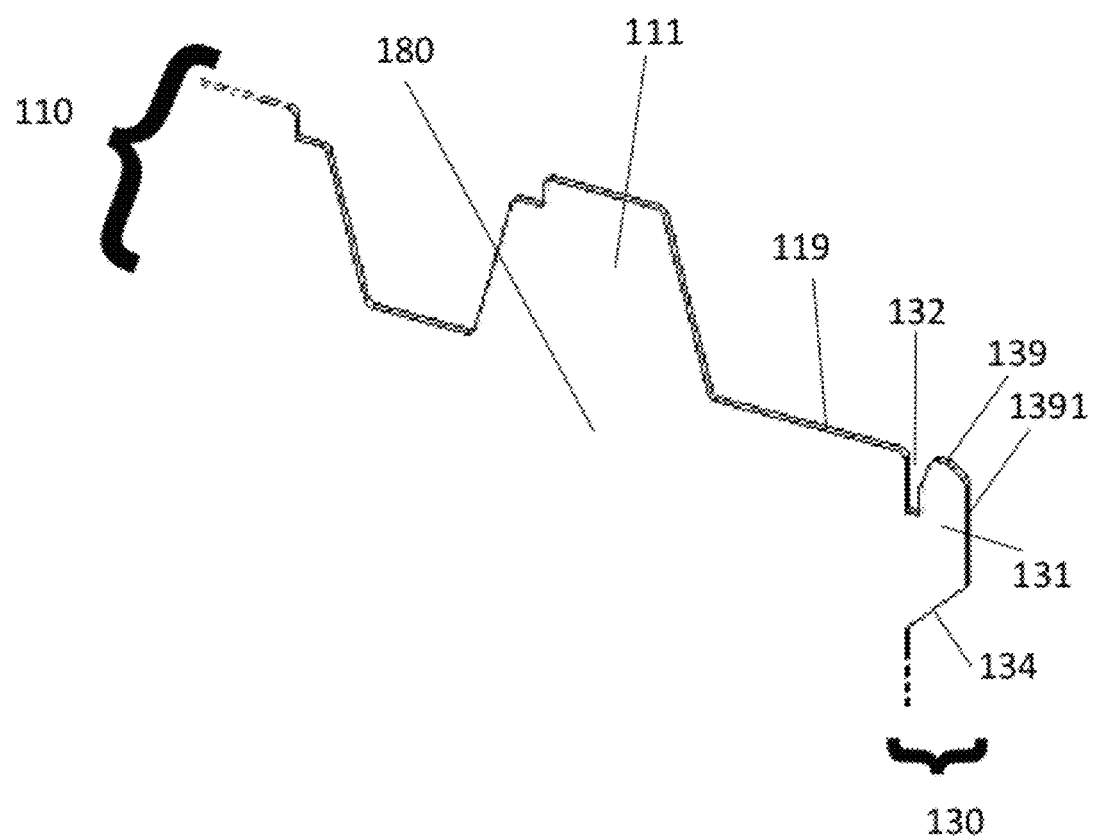
FIG. 1B is a perspective view of a portion of a sidewall plate.

The first side plate 100 can include opposite first and second planar faces, and each of the top support portion 110, the bottom support portion 120, the male side portion 130, and the female side portion 140 can include respective side edges. The side edges can be substantially perpendicular to the first and second planar faces of the first side plate 100. For example, as illustrated in FIG. 1B, the top support portion 110 can include a top side edge surface 119 (e.g., perpendicular to the first and second planar faces of the first side plate 100), and the male side portion 130 can include a male side edge surface 139 (e.g., perpendicular to the first and second planar faces of the first side plate 100), and so on.

Each of the side edge surfaces can be considered to consist of multiple side edge surface portions. Referring again to FIG. 1A, for example, the male side edge surface 139 can be considered to consist of multiple side edge surface portions, such as including a first male side edge surface portion 1391, a second male side edge surface portion 1392, and so on. Each of these side edge surface portions can comprise a continuous side edge surface of the first side plate 100.

In the example of FIG. 1A, the top support portion 110 can include a non-linear edge. The non-linear edge of the top support portion 110 can include, among other features, one or more extension or post features. For example, the top support portion 110 can include a first extension 111, a second extension 113, or a third extension 115, any of which can extend away from the body portion 180 of the first side plate 100. A first port 112 can be disposed between the first extension 111 and the second extension 113, and a second port 114 can be disposed between the second extension 113 and the third extension 115. When the first side plate 100 is connected with other side plates to form a fire-resistant enclosure, the first and second ports 112 and 114 can be configured as air ports, such as can be used to maximize or control combustion within the enclosure. For example, the first and second ports 112 and 114 can be configured as airflow outlet ports or vents. Additional features of the top support portion 110 are described below in the discussion of FIG. 1C, among other places throughout this document.

In the example of FIG. 1A, the bottom support portion 120 can include a non-linear edge. The non-linear edge of the bottom support portion 120 can include, among other features, a first foot 121, a second foot 123, or a third foot 125. In an example, a first port 122 can be disposed between the first foot 121 and the second foot 123, and a second port 124 can be disposed between the second foot 123 and the third foot 125. When the first side plate 100 is connected with other side plates to form a fire-resistant enclosure, the first and second ports 122 and 124 can be configured as air ports, such as to maximize or control combustion within the enclosure, in conjunction with the first and second ports 112 and 114. In an example, the first and second ports 122 and 124 can be configured as airflow inlet ports or vents.

In the example of FIGS. 1A and 1B, the male side portion 130 can include one or more mating features configured to connect to an adjacent side plate. For example, the male side portion 130 can include a first mating tab 131. The first mating tab 131 can extend laterally away from the body portion 180 of the first side plate 100, for example, perpendicularly to the first extension 111. The male side edge surface 139 can follow the outer extents of the first mating tab 131, such as along the first male side edge surface portion 1391. The first mating tab 131 can include a diagonal portion 134 that can be configured to seat the first mating tab 131 of the first side plate 100 into a corresponding slot in an adjacent side plate. The first mating tab 131 can include a tapered slot 132 configured to receive the body portion of an adjacent, mating side plate.

In the example of FIG. 1A, the male side portion 130 of the first side plate 100 can include additional mating tabs, such as a second mating tab 133 or a third mating tab 135, disposed along the edge of the first side plate 100. The first, second, and third mating tabs 131, 133, and 135 can be similarly sized and shaped. In some examples, the mating tabs can be provided in different shapes or configurations. The different shapes or configurations can be used to achieve various degrees of connection security when the first side plate 100 is connected to one or more adjacent side plates.

In the example of FIG. 1A, the female side portion 140 can include one or more female mating features configured to connect to an adjacent side plate. The female mating features can correspond to the one or more male mating features of the male side portion 130 of an adjacent side plate. For example, the female side portion 140 can include a first mating slot 141 that can correspond to the first mating tab 131. Horizontal and vertical extents of the first mating slot 141 can substantially correspond to horizontal and vertical extents of the first mating tab 131. That is, the height and width of the first mating tab 131 can be configured such that it can pass through the first mating slot 141. A top portion of the first mating slot 141 can vertically correspond, as shown with the dotted line in FIG. 1A, with a bottom portion of the tapered slot 132, on the same side plate or on an adjoining side plate.

In the example of FIG. 1A, the female side portion 140 of the first side plate 100 includes a second mating slot 143 and a third mating slot 145 disposed along the edge of the first side plate 100. The first, second, and third mating slots 141, 143, and 145 can be similarly size and shaped, or can be varied, to achieve various degrees of stability or connection security when the first side plate 100 is connected to one or more adjacent side plates. Although three mating slots have been discussed, it is to be understood that more or fewer than three mating slots can be used.

Figure 2:
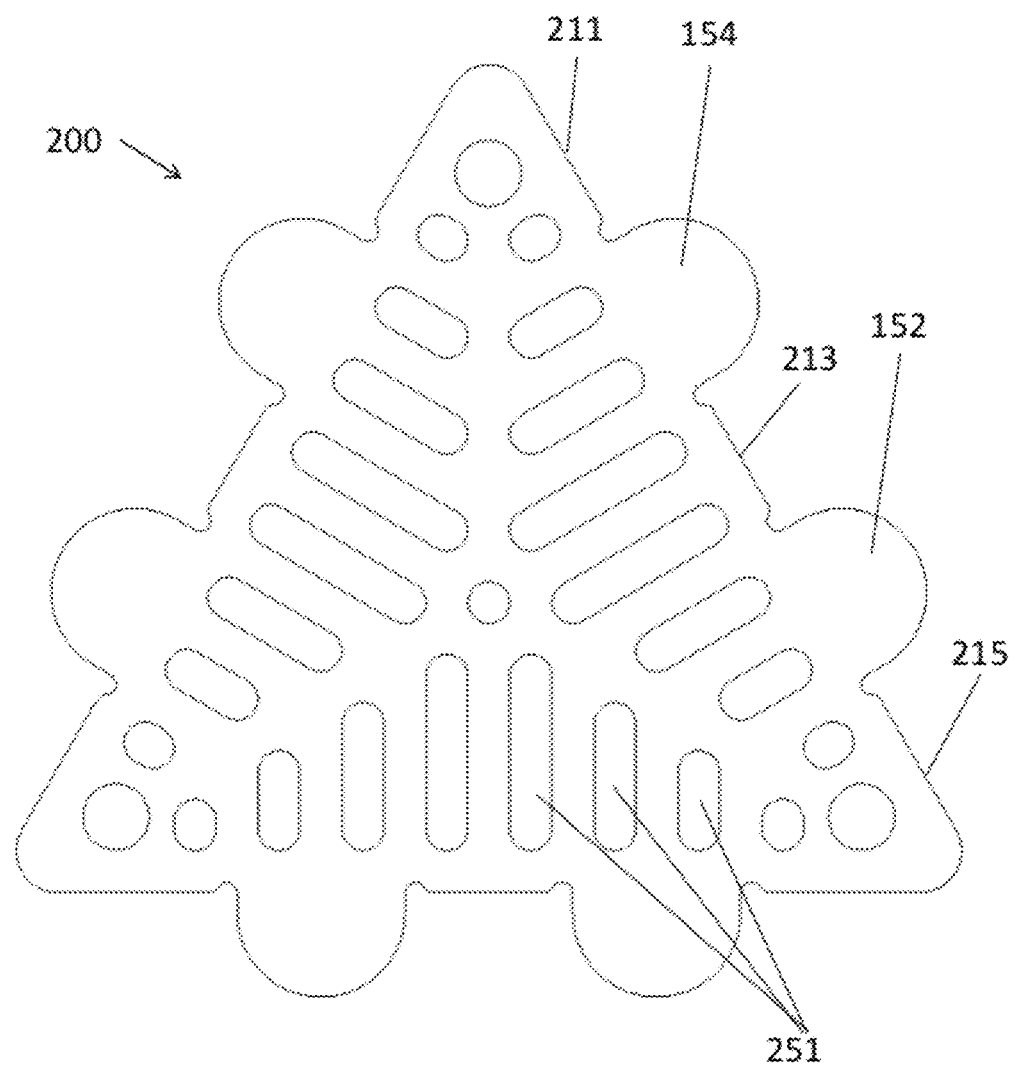
FIG. 2 is a side view of a cross plate or top grate.

The first side plate 100 can include one or more horizontal slots configured to receive a cross plate (see, e.g., the cross plate or top grate 200 illustrated in FIG. 2). For example, the first side plate 100 includes a first horizontal slot 151 and a second horizontal slot 153. The horizontal and vertical extents of the horizontal slots 151 and 153 can be adjusted depending on the height and width of mating tabs on the cross plate.

The first side plate 100 can include one or more locking tabs or locking tab slots disposed along the male side portion 130 or the female side portion 140. In the example of FIG. 1A, the male side portion 130 can include a first locking tab 160, and the female side portion 140 can include a first locking tab slot 162. The first locking tab 160 can be configured to be received in a locking tab slot in an adjacent side plate.

Figure 1C:
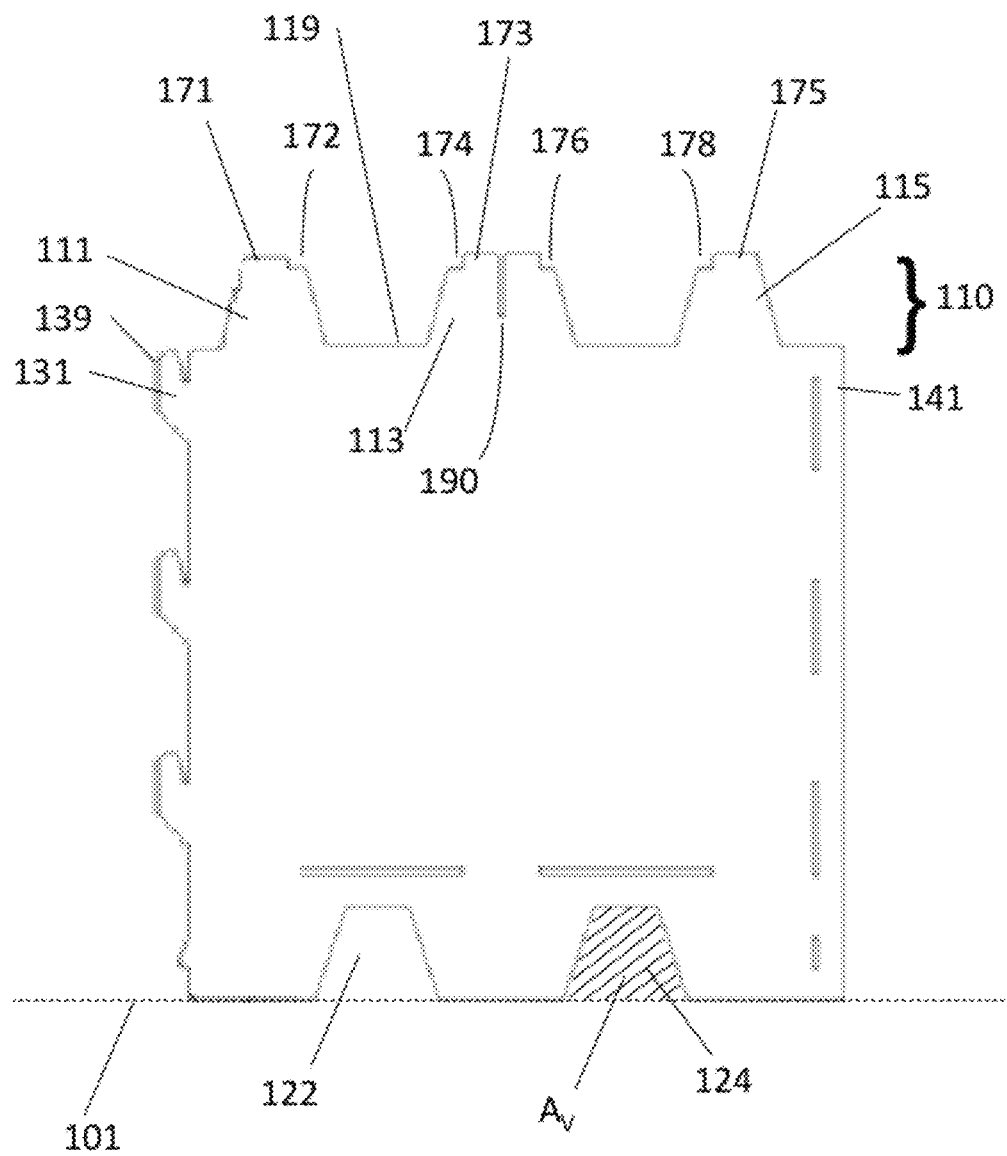
FIG. 1C is a side view of a sidewall plate.

FIG. 1C illustrates a side view of the first side plate 100. In addition to the extension and port features of the first side plate 100, discussed above, the top support portion 110 can include several additional features. For example, one or more of the extension features can include a slot 190. As shown and further described below, the slot 190 can be configured to receive various cross members to provide support for cookware or to provide stability for the enclosure.

The fire-resistant collapsible enclosure can be configured for use with a top grate (see, e.g., FIG. 2). As described more fully below in the description of FIG. 4, the sides or edges of the top grate can be configured to mate with one or more protrusions or recesses disposed along the top support portion 110. For example, the first extension 111 can include a first protrusion 171 or a first recess 172. The second extension 113 can include a second protrusion 173, or one or more recesses, such as a second recess 174 or a third recess 176. The third extension 115 can include a third protrusion 175 or a fourth recess 178. One or any combination of the protrusions and recesses along the top support portion 110 can be configured to receive and secure the top grate. Each of the protrusions and recesses can include corresponding edge surfaces that can be physically coupled to a top grate.

FIG. 1C further illustrates a vent area. As described above, the side plate 100 can include one or more ports (or none), for example, the first and second ports 122 and 124. An area of the second port 124 can be determined by calculating the open area of the vent when the bottommost edge of the side plate 100 is placed against a surface 101. The surface 101 can be a flat surface that is hypothesized for the purposes of calculating the vent surface area. However, it is to be understood that the side plate 100 can be placed against any type of surface area. In the example of FIG. 1C, the area of the second port 124 can be $A_V$, as shown by the hatched portion in the figure. An area of a port (e.g., one or more of the first and second ports 112 and 114) can be similarly determined. These vent areas can be adjusted to control combustion inside the enclosure, as more fully described below.

In one example, the side plate 100 can include a cutout or an impression that can extend at least partially through the planar faces of the plate. If a cutout is used, it can provide a side vent or access port to an internal combustion area of an enclosure. In some examples, the cutout or impression can additionally or alternatively be uniquely sized or shaped and used as a distinctive indication of source (e.g., a product name, trademark symbol, etc.).

FIG. 2 illustrates generally an example of a cross plate or top grate 200. In one example, a fire-resistant collapsible enclosure can be formed using at least one of a top grate or a cross plate. The cross plate or top grate 200 can be configured for use with a predetermined number of sidewall plates. For example, the cross plate or top grate 200 illustrated in FIG. 2 is configured for use with three sidewall plates, such as can be used to form a triangular enclosure. The cross plate or top grate 200 includes a non-linear edge, which can include one or more mating tabs.

In the example of FIG. 2, the cross plate or top grate 200 includes six mating tabs, including the first mating tab 152 and the second mating tab 154. The cross plate or top grate 200 includes a first edge segment 211, a second edge segment 213, or a third edge segment 215. The first and second mating tabs 152 and 154 can be configured to mate with the first and second horizontal slots 151 and 153, respectively, of the first side plate 100. The first, second, and third edge segments 211, 213, and 215, can be configured to engage or abut an inner wall surface of the body portion 180 of the first side plate 100, such as adjacent to the first and second horizontal slots 151 and 153. In one example, the first, second, and third edge segments 211, 213, and 215 can be configured to be spaced apart from an inner wall surface of the body portion 180 of the first side plate 100.

In one example, the cross plate or top grate 200 can be configured for use as a top grate. The first mating tab 152 of the cross plate or top grate 200 can be configured to mate with the first or second recesses 172 and 174 of the first side plate 100. Similarly, the second mating tab 154 of the cross plate or top grate 200 can be configured to mate with the third or fourth recesses 176 and 178 of the first side plate 100. The first, second, and third edge segments 211, 213, and 215, can correspond to the top support portion 110 of the first side plate 100. For example, the first edge segment 211 can be disposed near or engaged against an inner sidewall portion of the first protrusion 171. In an example, an interposing space can be disposed between the first edge segment 211 and the inner sidewall portion of the first protrusion 171. Similarly, the second edge segment 213 can be engaged against, or can be spaced apart from, an inner sidewall portion of the second protrusion 173. The third edge segment 215 can be engaged against, or can be spaced apart from, an inner sidewall portion of the third protrusion 175. In one example, a top edge of at least one of the first protrusion 171, the second protrusion 173, or the third protrusion 175 can be configured to extend beyond (i.e., above) an upper surface of the cross plate or top grate 200, such as when the cross plate or top grate 200 is coupled to the top support portion 110 of one or more side plates.

The cross plate or top grate 200 can include cutouts or multiple though-hole slots 251. The multiple through-hole slots 251 can be configured such that the cross plate or top grate 200 includes a predetermined percentage of open (i.e., through-hole) area. For example, the cross plate or top grate 200 can be configured to have about 30 to 50 percent open area. When the cross plate or top grate 200 is used as a fuel-supporting cross plate, the multiple through-hole slots 251 permit air to circulate below and reach the bottom of the fuel source. When the cross plate or top grate 200 is used as a top grate, the multiple through-hole slots 251 permit heat or flames to penetrate directly through the top grate, such as to grill food or more directly heat other items.

Figure 3A:
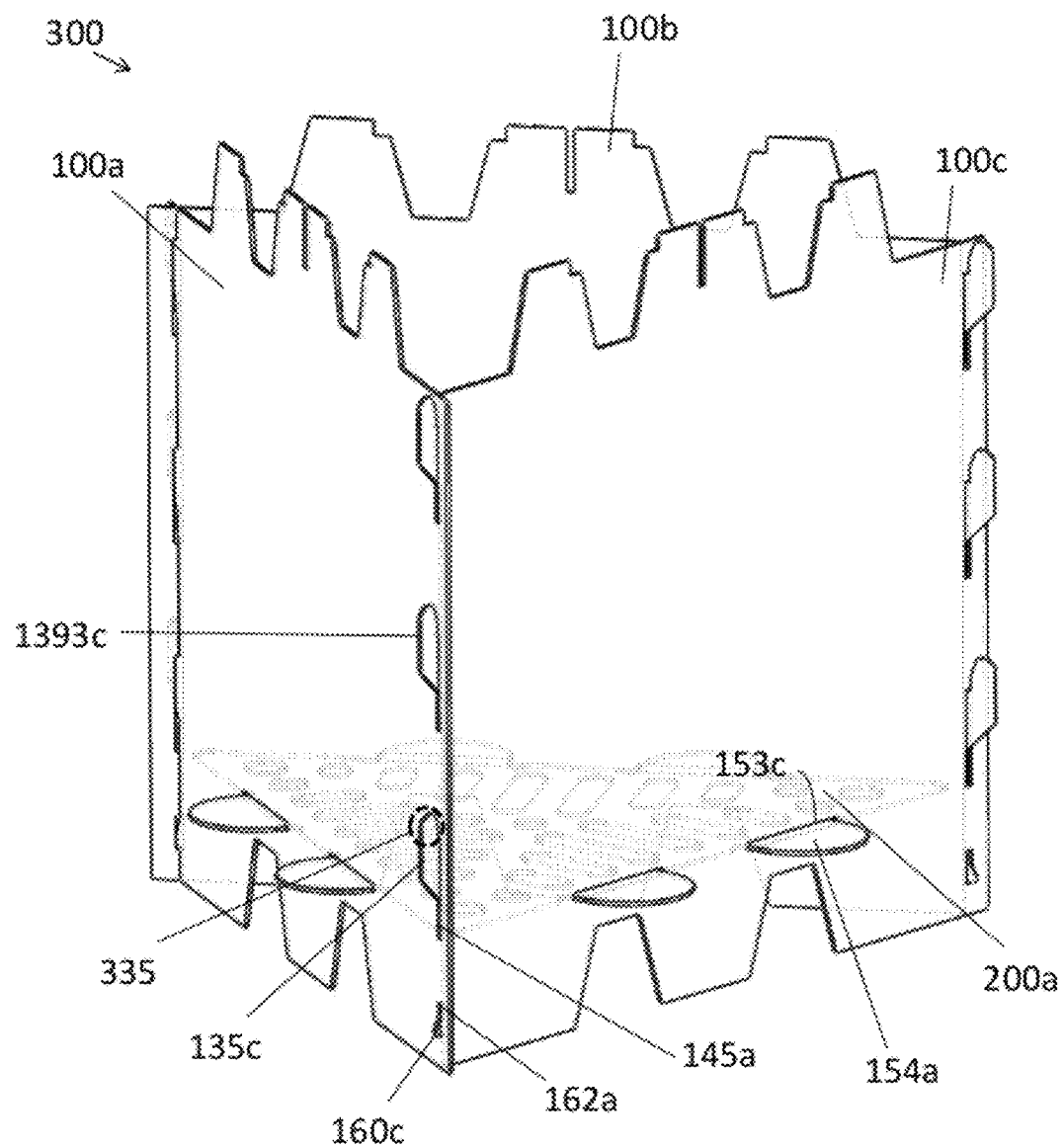
FIG. 3A is a perspective view of an assembled, fire-resistant, three-sided collapsible enclosure.

FIG. 3A illustrates generally an example of an assembled, fire-resistant, three-sided collapsible enclosure 300. The three-sided collapsible enclosure 300 can include a first side plate 100a, a second side plate 100b, and a third side plate 100c (e.g., one or more of the side plates can be configured as described above in the description of the first side plate 100). The three-sided collapsible enclosure 300 can optionally further include a first cross plate 200a, such as can be configured as described above in the description of the cross plate or top grate 200.

In one example, each of the first, second, and third side plates 100a, 100b, and 100c, can include mating features disposed along side portions of the plates such that two or more adjacent plates can be connected or coupled. For example, the first side plate 100a can include a mating slot 145a, and the third side plate 100c can include a corresponding mating tab 135c. The mating tab 135c can be inserted into the mating slot 145a. The mating slot 145a can include a tapered slot (e.g., the tapered slot 132) configured to receive a body portion of the third side plate 100c, such as to securely connect the first and third side plates 100a and 100c together.

The first side plate 100a can include a locking tab slot 162a. The locking tab slot 162a can be configured to receive a locking tab 160c on an adjacent side plate (e.g., the third side plate 100c). When the first and third side plates 100a and 100c are shifted laterally relative to one another, such as to seat or secure the mating tab 135c in the mating slot 145a, the locking tab 160c can be seated or secured in the locking tab slot 162a. In one example, a friction- or force-fit can be created in the interaction of the locking tab 160c and the locking tab slot 162a such that the first and third side plates 100a and 100c can be securely held together when the first and third side plates 100a and 100c are also joined via the mating tab 135c and the mating tab slot 145a.

In an assembled enclosure, mating the locking tab and locking tab slot can secure the entire collapsible enclosure such that the enclosure can be easily moved or picked up without inadvertently disengaging any of the sidewall plates. Additionally, because of the locking tab configuration, the secured enclosure can be used on uneven surfaces that would otherwise cause the plates to disengage.

One or more of the side plates 100a, 100b, and 100c, can be made of a material that is at least minimally pliable or bendable. That is, a portion of the first side plate 100a can be bent or otherwise flexed relative to another portion of the plate. For example, the bottom support portion 120 can be bent by at least about 2 degrees relative to a top support portion 110 of the first side plate 100a. This flexibility of the one or more side plates can aid in the secure connection of adjacent plates. For example, the bottom support portion 120 comprising the locking tab slot can be slightly bent or lifted, such as away from an adjacent side plate, to disengage the locking tab from the slot and disassemble the enclosure.

Figure 3B:
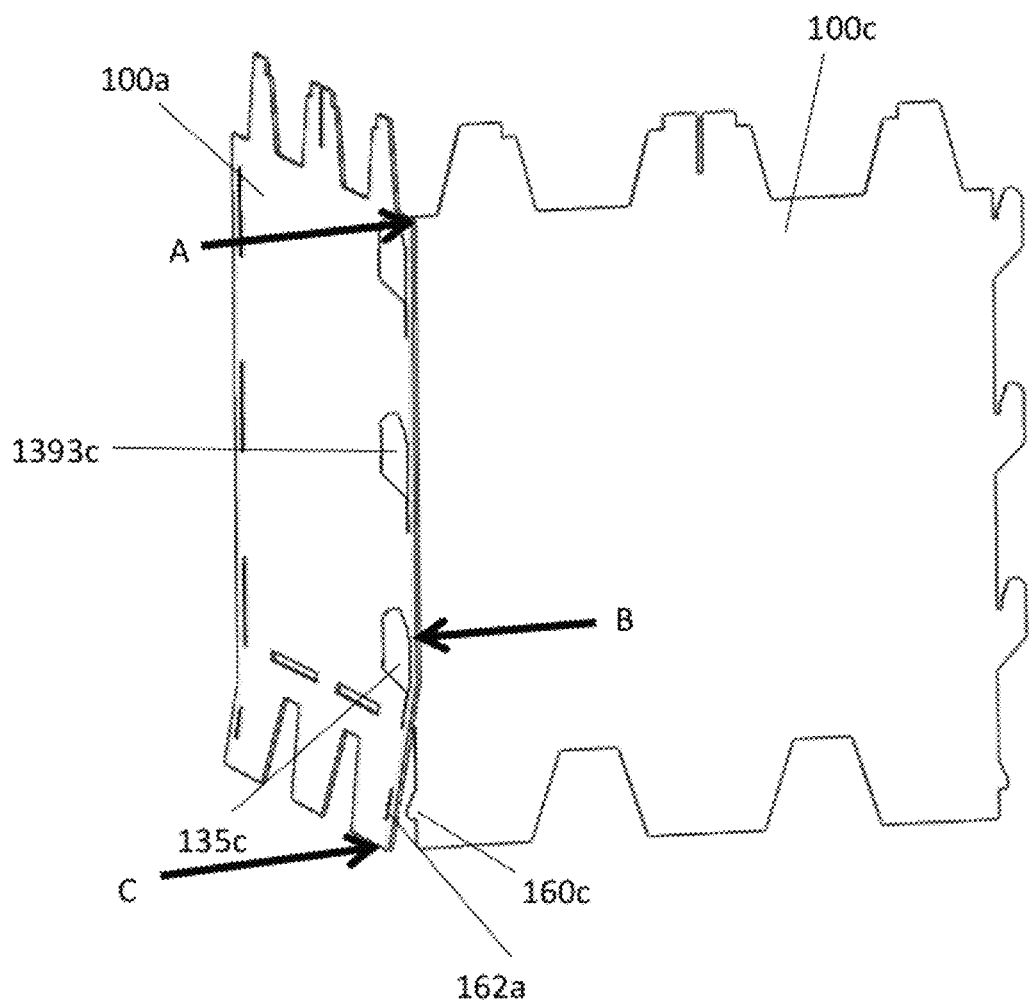
FIG. 3B is a perspective view of a partially assembled fire-resistant collapsible enclosure.

FIG. 3B illustrates generally a portion of the collapsible enclosure 300 that includes the first side plate 100a and the third side plate 100c. As shown, a portion of the first side plate 100a can be bent relative to another portion of the plate. In an example, when a mating tab of a first side plate is nearly fully inserted into a mating tab slot of an adjacent side plate, interference from a locking tab can prevent a portion of a side edge of the first side plate from contacting a portion of a planar surface of the adjacent side plate. In the example of FIG. 3B, for instance, when the mating tabs of the third side plate 100c are first inserted into corresponding mating tab slots on the first side plate 100a, a portion of a male side edge surface of the third side plate 100c can be partially prevented from contacting a planar surface of the first side plate 100a. That is, when first inserted, some portions of the male side edge surface of the third side plate 100c can be substantially in contact with a planar surface of the first side plate 100a along a length of the surface between points A and B, as shown in FIG. 3B (e.g., the male side edge surface portions 1392c and 1394c (not shown) can be substantially in contact with a planar surface of the first side plate 100a). Several other portions of the male side edge surface of the third side plate 100c can be prevented from contacting the planar surface of the first side plate 100a, such as along the length of the surface between points B and C because of interference of the locking tab 160c with the planar surface of the first side plate 100a. For example, the male side edge surface portions 1396c and 1397c (not shown) can be substantially prevented from contacting the first side plate 100a. When the first and third side plates 100a and 100c are shifted relative to one another (e.g., vertically shifted) to seat the body portion of the first side plate 100a within the tapered slots of the mating tabs, the locking tab 160c can become seated in the locking tab slot 162a (e.g., as shown in FIG. 3A). With the locking tab 160c seated in the locking tab slot 162a, substantially all of the male side edge surface portions 1392c, 1394c, 1396c, and 1397c, of the third side plate 100c can be in surface contact with a planar surface of the first side plate 100a. In some examples, an offset distance can be maintained between adjacent plates such that the male side edge surface portions are disposed a short distance away from the planar surface of an adjacent plate.

Various features of the mating and locking tabs can be selected to further aid in creating or maintaining a secure connection between adjacent plates. For example, referring again to FIG. 3A, the mating tab 135c can optionally include a nose portion 335 that can extend vertically in a first direction away from a base portion of the mating tab 135c. After the mating tab 135c is inserted into a corresponding mating tab slot (e.g., the mating tab slot 145a), the nose portion 335 can be disposed on a first side of the first side plate 100a, and a body portion of the third side plate 100c can be disposed on an opposite side of the first side plate 100a. Similarly, after the locking tab 160c is fully inserted into a corresponding locking tab slot (e.g., the locking tab slot 162a), a portion of the locking tab 160c and a body portion of the third side plate 100c can be disposed on opposite sides of the first side plate 100a.

Other pairs of adjacent side plates can include a locking tab or a locking tab slot. For example, as shown in FIG. 3A, each of the side plates 100a, 100b, and 100c, can include at least one locking tab and at least one locking tab slot. The locking tabs and locking tab slots can be disposed anywhere along the side portions of the side plates as long as they correspond to respective locking tabs or locking tab slots in an adjacent side plate.

The three-sided collapsible enclosure 300 can optionally include the first cross plate 200a. The first cross plate 200a can be matingly engaged with one or more of the first, second, or third side plates 100a, 100b, or 100c. For example, a mating tab 154a of the first cross plate 200a can be mated with a horizontal slot 153c of the third side plate 100c. The horizontal slot 153c can be disposed intermediately between top and bottom portions of the third side plate 100c.

In one example, the first cross plate 200a can be used to support food or fuel. For example, the three-sided collapsible enclosure 300 can be configured for use as an oven, and the oven can be disposed near a heat source (e.g., proximal to a camp fire). Food or other objects disposed on the first cross plate 200a, such as inside of the three-sided collapsible enclosure 300, can thus be heated. In one example, the first cross plate 200a can be used as a fuel support. For example, the three-sided collapsible enclosure 300 can be configured for use as a stove or grill, and a fuel source can be placed on the first cross plate 200a (e.g., foraged sticks or wood chips, among other fuel sources). A food source (or other object to be heated) can be placed on top of or proximal to the three-sided collapsible enclosure 300 to be heated.

Figure 4:
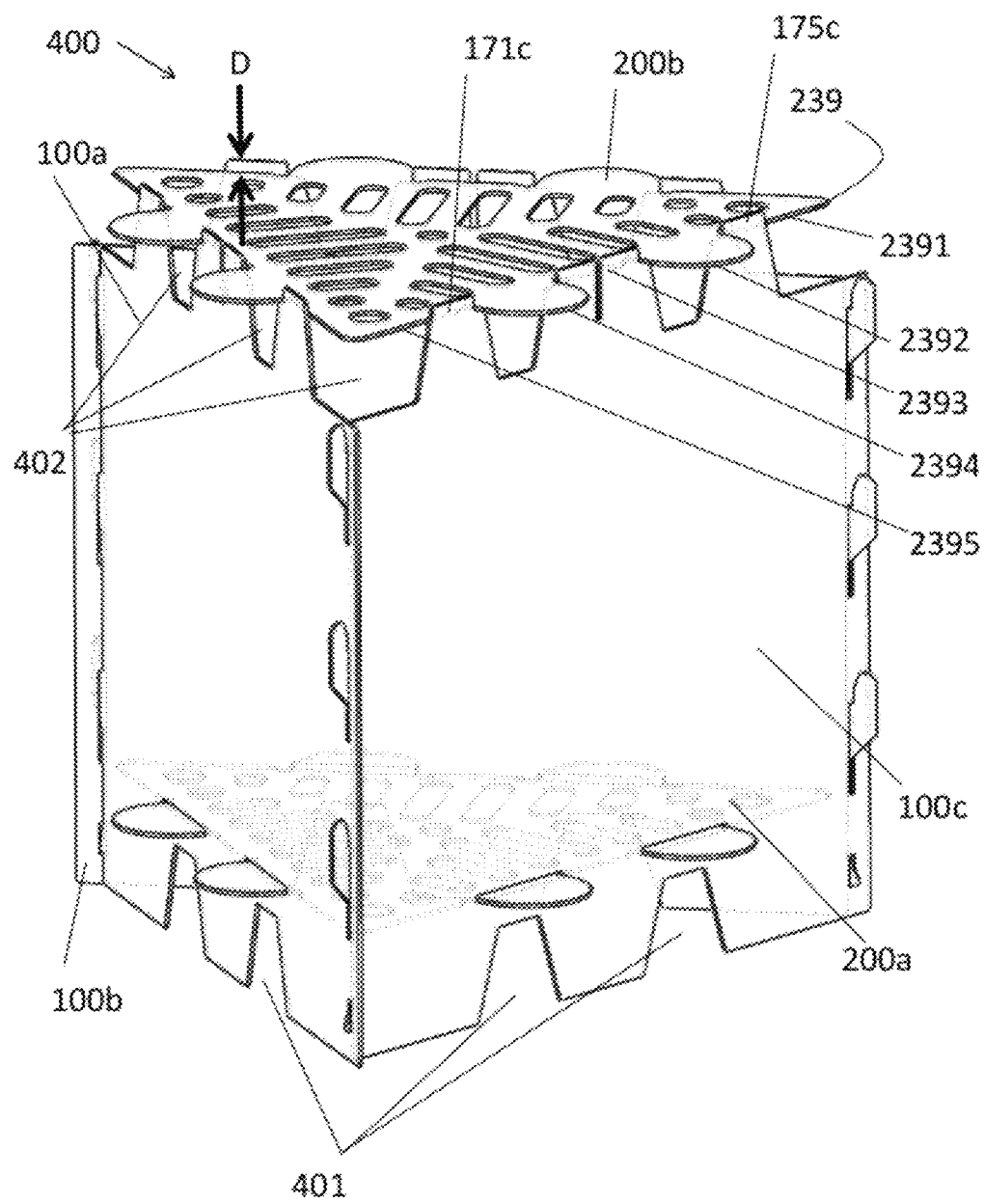
FIG. 4 is a perspective view of an assembled, fire-resistant, three-sided collapsible enclosure that includes a top grate.

FIG. 4 illustrates an example of an assembled, fife-resistant, three-sided collapsible enclosure 400. The three-sided collapsible enclosure 400 can include a first side plate 100a, a second side plate 100b, and a third side plate 100c, as described above in the discussion of FIG. 3A. The three-sided collapsible enclosure 400 can optionally further include at least one of a first cross plate 200a or a second cross plate 200b, each of which can be configured as described above in the description of the cross plate or top grate 200.

Surfaces or side edges of the second cross plate 200b can be matingly engaged with one or more surfaces or side edges of any one or more of the first side plate 100a, the second side plate 100b, or the third side plate 100c. The second cross plate 200b can include a side edge 239 comprising a first side edge portion 2391, a second side edge portion 2392, a third side edge portion 2393, a fourth side edge portion 2394, or a fifth side edge portion 2395. Any one or more of these side edge portions can be configured to engage with a top portion of a side plate. In the example of FIG. 4, for example, the side edge portions 2391, 2393, and 2395 can be configured to engage with an inner planar surface of the third side plate 100c, such as by physically contacting, or by being offset from, the inner planar surface of the third side plate 100c. For example, the first side edge portion 2391 can be engaged with an inner planar surface of a third protrusion 175c of the third side plate 100c. The fifth side edge portion 2395 can be engaged with an inner planar surface of a first protrusion 171c of the third side plate 100c. One or more of the extension features of the side plates can extend above the second cross plate 200b when the second cross plate 200b is disposed on the top support portion 110 of the collapsible enclosure 400. In the example of FIG. 4, the extension features of the second side plate 100b can extend above the second cross plate 200b by a distance D. This extension of the side plate beyond the top surface of the second cross plate 200b can add stability to the collapsible enclosure 400 by aiding in retaining the second cross plate 200b when the structure is in use.

In an example, the second cross plate 200b can be sized such that, when the collapsible enclosure 400 is assembled, an interference or friction fit is created between the second cross plate 200b and the side plates. Any or all of the cross plates and side plates (e.g., the first or second cross plates 200a or 200b, or the first, second, or third side plates 100a, 100b, or 100c) can be configured such that when the plates are exposed to high heat levels (i.e., several hundred degrees Celsius), thermal expansion of the plates does not interfere with the interconnection of the plates. For example, the second cross plate 200b can be dimensionally configured such that under high heat conditions, the second cross plate 200b can maintain a seated position with respect to the top support portions 110a, 110b, or 110c, of the side plates.

A planar surface of the second cross plate 200b can be configured to engage with a side edge of a side plate. In the example of FIG. 4, for example, a bottom planar surface of the second cross plate 200b can be configured to engage with top side edge surfaces of the first, second, and third side plates 100a, 100b, or 100c. In one example, the bottom planar surface of the second cross plate 200b can be engaged with one or more of the edge surfaces corresponding to the first, second, third, or fourth recesses 172, 174, 176, or 178, of the third side plate 100c (the first, second, third, and fourth recesses 172, 174, 176, and 178, are not labeled in the illustration of FIG. 4, but are to be understood as the corresponding recesses illustrated in FIG. 1C).

The second cross plate 200b can be disposed at or near a top support portion 110 of the collapsible enclosure 400. In this configuration, the second cross plate 200b can be used as a food or fuel support. For example, the collapsible enclosure 400 can be configured to heat food or other objects indirectly, such as by using the second cross plate 200b as a fuel support. Food or other objects to be heated can be placed inside of the collapsible enclosure 400, such as on the ground. If the assembly further includes the first cross plate 200a, food or other objects to be heated can be placed on the first cross plate 200a.

Food or other objects to be heated can be placed on top of the second cross plate 200b. In this example, a fuel source can be provided inside of the collapsible enclosure 400, such as on the ground or on the first cross plate 200a. In this manner, the collapsible enclosure 400 can be configured as a grill or a stove.

In one example, a fire-resistant collapsible enclosure such as the enclosure 400, can include one or more air ports and one or more air ports. The size and location of these vents can be adjusted to control combustion of a fuel source inside of the enclosure. In the example of FIG. 4, multiple air ports 401 or 402 can be provided. One or more of the side plates used to form the enclosure 400 can include an air port, which can be provided according to the discussion of the ports 122 or 124 in FIG. 1. Similarly, one or more of the side plates used to form the enclosure 400 can include an air port, such as can be provided according to the discussion of the ports 112 or 114 in FIG. 1.

A fire-resistant, multi-sided collapsible enclosure can include an internal enclosure volume, which can be used to contain a combustible fuel source. The volume of an n-sided enclosure can be defined as the volume that is substantially enclosed by the inner surfaces of the n side plates, an upper surface of a first cross plate, and a lower surface of a second cross plate. For example, the volume of the enclosure 400 can be defined as the volume that is substantially enclosed by the inner surfaces of the first, second, and third side plates 100a, 100b, and 100c, the upper surface of the first cross plate 200a, and the lower surface of the second cross plate 200b. A fire-resistant, multi-sided collapsible enclosure can include an enclosure area, such as can be defined as a horizontal or vertical cross-sectional area of the enclosure. The relationship of one or more of the enclosure volume or enclosure area to the inlet and port areas can be adjusted to control combustion of a fuel source disposed inside of the enclosure. Different relationships can be provided, such as depending on the type of fuel source to be used, the number of sides of the enclosure, or the location or configuration of any air inlet or ports.

In an example, one or more of the air ports can be configured as an air inlet or an air outlet. For example, ports at the bottom of an enclosure can be configured as air inlets (e.g., the first and second ports 112 and 114), and ports at the top of the enclosure can be configured as air outlets (e.g., the first and second portions 122 and 124). In one example where the fuel source to be used is a hardwood foraged fuel, the following relationships have been found to work well, although other relationships can be used as well (preferred values are indicated in parenthesis):

$$\frac{\text{air inlet area}}{\text{enclosure volume}} = 0.28 \text{ to } 0.44 \text{ (0.43)};$$

-continued $$\frac{\text{air outlet area}}{\text{enclosure volume}} = 0.46 \text{ to } 0.08 \text{ (0.07)};$$

$$\frac{\text{air inlet area}}{\text{enclosure area}} = 0.13 \text{ to } 0.18 \text{ (0.18)};$$

or $$\frac{\text{air outlet area}}{\text{enclosure area}} = 0.22 \text{ to } 0.39 \text{ (0.29)}.$$

Air port area can, in some cases, be manually adjusted, such as when the enclosure 400 is used in contact with the ground. A user of the enclosure 400 can adjust the airflow by bringing dirt, sand, or other debris up to the port(s) to block a portion of an air port and decreasing the effective inlet area. In this manner, a user can effectively cut off airflow into the enclosure 400.

Figure 5:
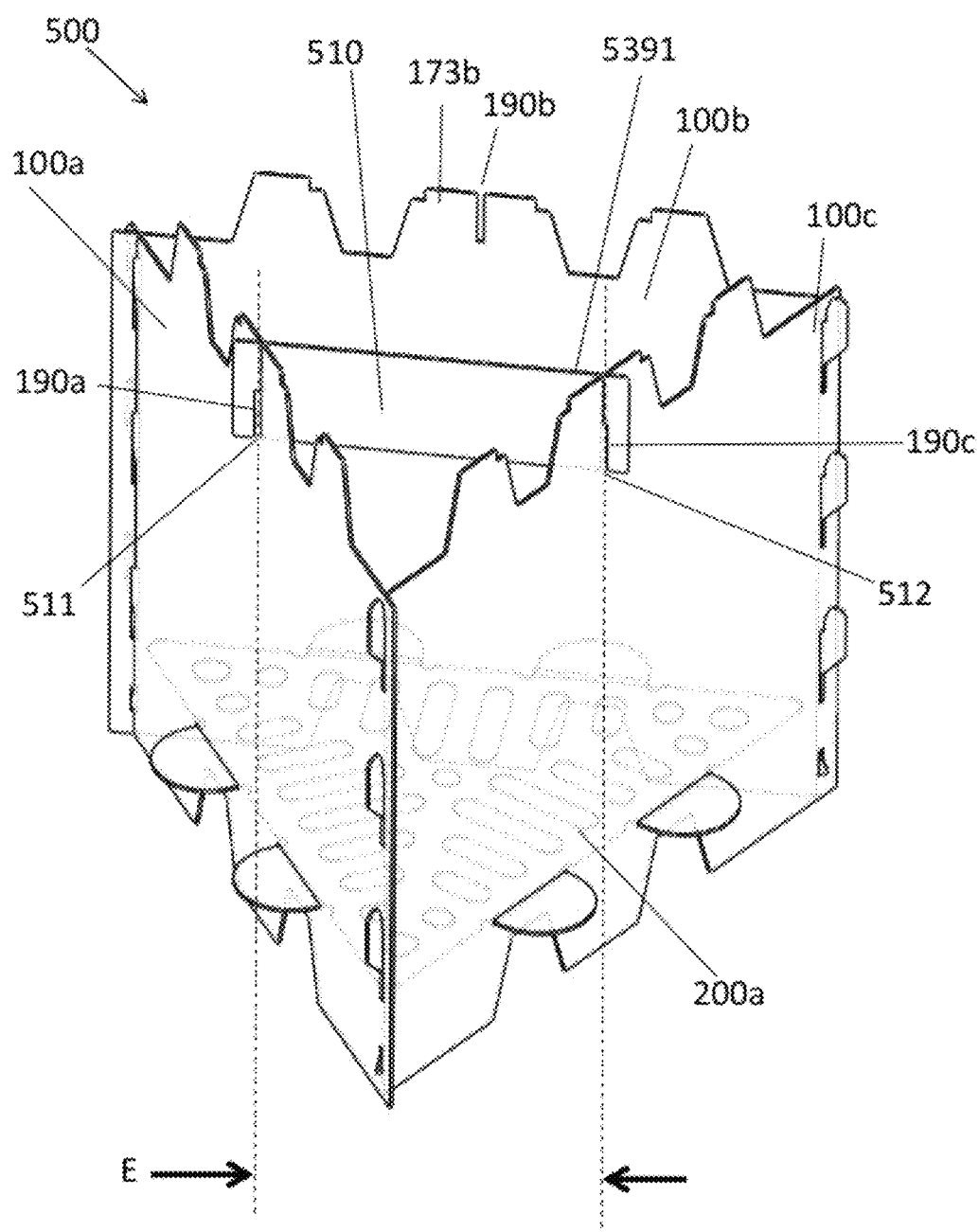
FIG. 5 is a perspective view of an assembled, fire-resistant, three-sided collapsible enclosure that includes a cross bar support.

FIG. 5 illustrates generally an example of an assembled, fire-resistant, three-sided collapsible enclosure 500. The collapsible enclosure 500 can include a first side plate 100a, a second side plate 100b, and a third side plate 100c (e.g., one or more of the side plates can be configured as described above in the description of the first side plate 100). The collapsible enclosure 500 can include a first cross bar 510, or can optionally further include a first cross plate 200a, which can be configured as described above in the description of the cross plate or top grate 200.

In one example, two or more of the first, second, or third side plates 100a, 100b, or 100c, can include slots 190a, 190b, or 190c, which can be disposed in one or more of the extension features of the top support portions of the plates. The slots can be of a sufficient width and length to receive the first cross bar 510.

The first cross bar 510 can be a substantially rectangular, planar, plate-like member, which can be formed from the same material as the side plates 100a, 100b, and 100c, among other materials. The first cross bar 510 can include a substantially flat upper edge surface 5391. When the first cross bar 510 is coupled with two or more of the side plates, the upper edge surface 5391 can be substantially coplanar with an upper edge surface of one or more of the first, second, or third side plates 100a, 100b, or 100c. For example, the upper edge surface 5391 can be substantially coplanar with an upper edge surface of the second protrusion 173b of the second side plate 100b.

The first cross bar 510 can include at least two slots 511 and 512 extending vertically inward from a surface opposite the upper edge surface 5391. The two slots can be disposed near opposite ends of the bar. In the example of FIG. 5, the distance between the two slots, E, can be selected to be about the distance between two of the slots 190a, 190b, or 190c, in adjacent side plates, such as when the collapsible enclosure 500 is assembled. For example, the distance E can be the distance between the slots 190a and 190c in the first and third side plates 100a, and 100c, respectively, when the collapsible enclosure 500 is assembled. Accordingly, the at least two slots 511 and 512 can matingly engage with the slots 190a and 190c.

The first cross bar 510 can thus be configured to extend over an open, central portion of the collapsible enclosure 500, and, in some examples, can extend beyond the outer planar extents of the side plates of the collapsible enclosure 500, as shown in FIG. 5. When the first cross bar 510 is used, objects that might otherwise fall into the collapsible enclosure 500 can be supported and maintained outside of the collapsible enclosure 500. For example, a cup having a circular footprint of radius r can be heated using the collapsible enclosure, where r is less than about half the width of one of the side plates. If the cup having the circular footprint of radius r is to be heated using the collapsible enclosure 500 with a fuel source disposed on the first cross plate 200a, the first cross bar 510 can be used to support the cup above the center of the collapsible enclosure. Without the first cross bar 510, the cup would have to be precariously balanced on an edge or corner portion of the top of the collapsible enclosure 500, or the cup could otherwise not be heated using the collapsible enclosure 500. In one example, the first cross bar 510 can extend substantially further beyond the outer planar extents of the side plates, such as to provide additional support for large objects placed on top of the collapsible enclosure 500.

Fire-resistant collapsible enclosures comprising more than three sides can also be formed, such as using several side plates according to the first side plate 100. For example, a four-sided collapsible enclosure can include four side plates configured as described above in the discussion of the first side plate 100. Accordingly, the cross plate or top grate 200 can optionally be modified to have four sides. In some configurations, the dimensions of the cross plate or top grate 200 can be selected such that it can function as a cross plate or top grate for a three- or four-sided collapsible enclosure.

In one example, a four-sided collapsible enclosure can include two pairs of substantially identical side plates. For example, the four-sided collapsible enclosure can include two male side plates and two female side plates.

Figure 6A:
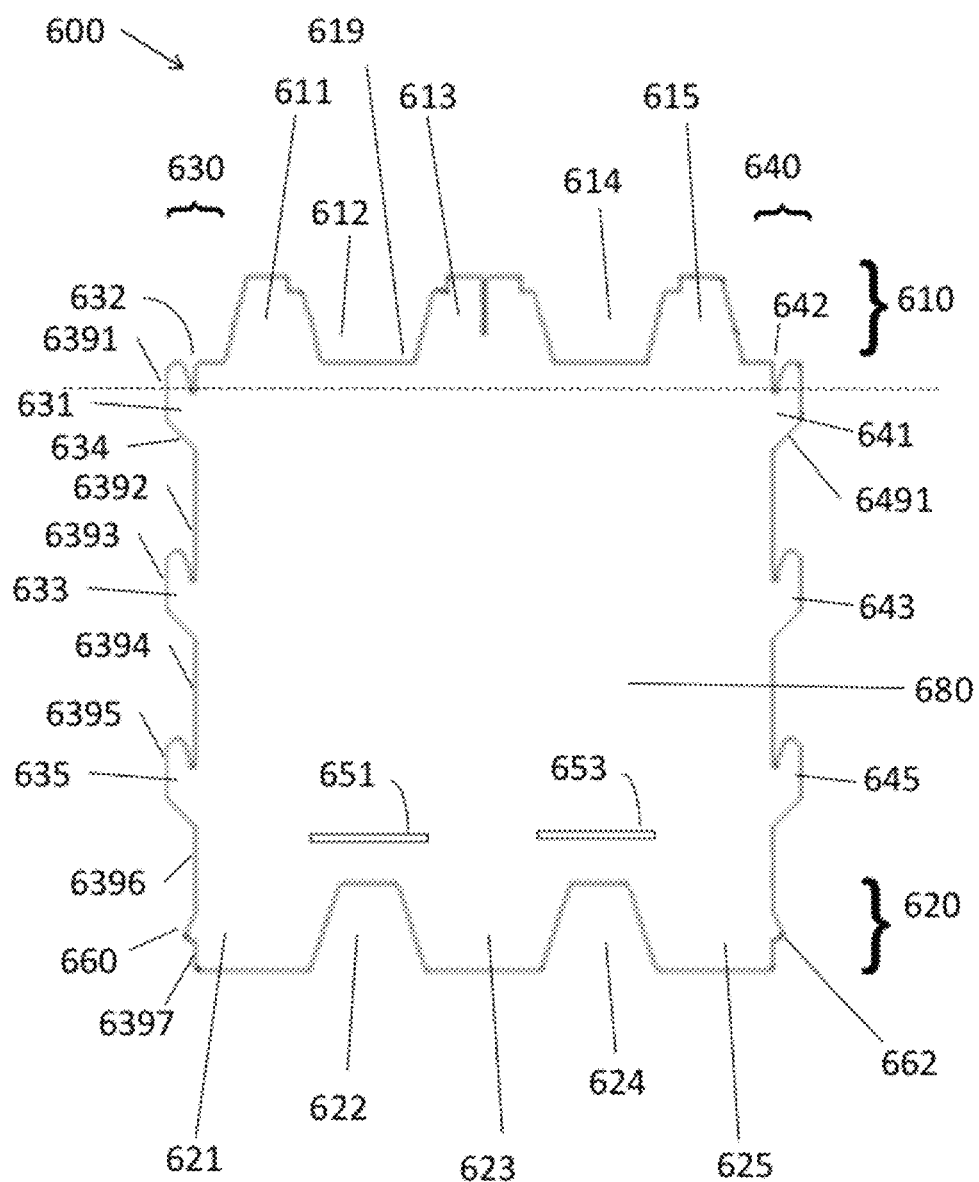
FIG. 6A is a side view of a male sidewall plate.

FIG. 6A illustrates generally an example of a male side plate 600, such as can be used as one of four side plates, or sidewalls, to form a four-sided collapsible enclosure. The male side plate 600 can include a top support portion 610, a bottom support portion 620, a first male side portion 630, a second male side portion 640, and a body portion 680.

The male side plate 600 can include first and second planar faces, and each of the top support portion 610, the bottom support portion 620, and the first and second side portions 630 and 640, can include respective side edges, such as can be substantially perpendicular to the first and second planar faces of the male side plate 600. For example, the top support portion 610 can include a top side edge surface 619, and the first male side portion 630 can include a first male side edge surface 6391. Each of the side edge surfaces can be considered to consist of multiple side edge surface portions. For example, the first male side edge surface 6391 can be considered to consist of multiple side edge surface portions, such as including a first male side edge surface portion 6391, a second male side edge surface portion 6392, and so on, as illustrated in FIG. 6A. Each of these side edge surface portions can comprise a continuous side edge surface.

In the example of FIG. 6A, the top support portion 610 can include a non-linear edge. The non-linear edge of the top support portion 610 can include, among other features, one or more extension or post features. For example, the top support portion 610 can include a first extension 611, a second extension 613, or a third extension 615. Any one or more of the extensions 611, 613, or 615 can extend away from the body portion 680. In one example, a first port 612 can be disposed between the first extension 611 and the second extension 613. A second port 614 can be disposed between the second extension 613 and the third extension 615. When the male side plate 600 is connected with other side plates, such as female side plates, to form an enclosure, the first and second ports 612 and 614 can be configured as air ports, such as to maximize or control combustion within the enclosure. Additional features of the top support portion 610, such as including the several protrusions and recesses illustrated in FIG. 6A, can be substantially similar to those features as described above in the discussion of FIG. 1C, among other places throughout this document.

In the example of FIG. 6A, the bottom support portion 620 can include a non-linear edge. The non-linear edge of the bottom support portion 620 can include, among other features, a first foot 621, a second foot 623, or a third foot 625. In the example, a first port 622 can be disposed between the first foot 621 and the second foot 623. A second port 624 can be disposed between the second foot 623 and the third foot 625. When the male side plate 600 is connected with other side plates to form a fire-resistant enclosure, the first and second ports 622 and 624 can be configured as air ports, such as to maximize or control combustion within the enclosure, in conjunction with the first and second ports 612 and 614.

In the example of FIG. 6A, the first male side portion 630 can include one or more mating features configured to connect to an adjacent side plate. For example, the first male side portion 630 can include a first mating tab 631. The first mating tab 631 can include an extension portion that extends laterally away from the body portion 680 of the male side plate 600. A side edge surface, perpendicular to the planar surface of the body portion 680, can follow this extension portion, along the first male side edge surface portion 6391. In one example, the first mating tab 631 can include a diagonal portion 634 configured to seat the first mating tab 631 of the male side plate 600 into a corresponding slot, such as a slot on an adjacent female side plate. The first mating tab 631 can include a tapered slot 632 configured to receive the body portion of an adjacent female side plate.

In the example of FIG. 6A, the first male side portion 630 of the male side plate 600 can include additional mating tabs, such as a second mating tab 633 or a third mating tab 635 disposed along the edge of the male side plate 600. The first, second, and third mating tabs 631, 633, and 635 can be similarly sized and shaped. In some examples, the mating tabs can be different shapes, to achieve various degrees of connection security when the male side plate 600 is connected to one or more adjacent side plates.

In the example of FIG. 6A, the second male side portion 640 can include one or more mating features configured to connect to an adjacent side plate. The one or more mating features can be substantially the same as the mating features disposed along the first male side portion 630. For example, the mating features in the first and second male side portions 630 and 640 can be mirror images of each other, such that for each male mating feature in the first male side portion 630, there is an equivalent male mating feature in the second male side portion 640, as shown in FIG. 6A.

The second male side portion 640 can include a mating tab 641 that can be geometrically substantially the same as the first mating tab 631. That is, the mating tab 641 can include a diagonal portion 644 that is geometrically substantially the same as the diagonal portion 634, or the mating tab 641 can include a tapered slot 642 that is geometrically substantially the same as the tapered slot 632. The tapered slots 632 and 642 can terminate vertically at about the same distance from the top edge of the male side plate 600, as illustrated by the dashed line in FIG. 6A.

In the example of FIG. 6A, the second male side portion 640 of the male side plate 600 can include additional mating tabs, such as the mating tabs 643 and 645. The first, second, and third mating tabs 641, 643, and 645 can be similarly sized and shaped. In some examples, the mating tabs can be different shapes, such as to achieve various degrees of connection security when the male side plate 600 is connected to one or more adjacent side plates.

Figure 8A:
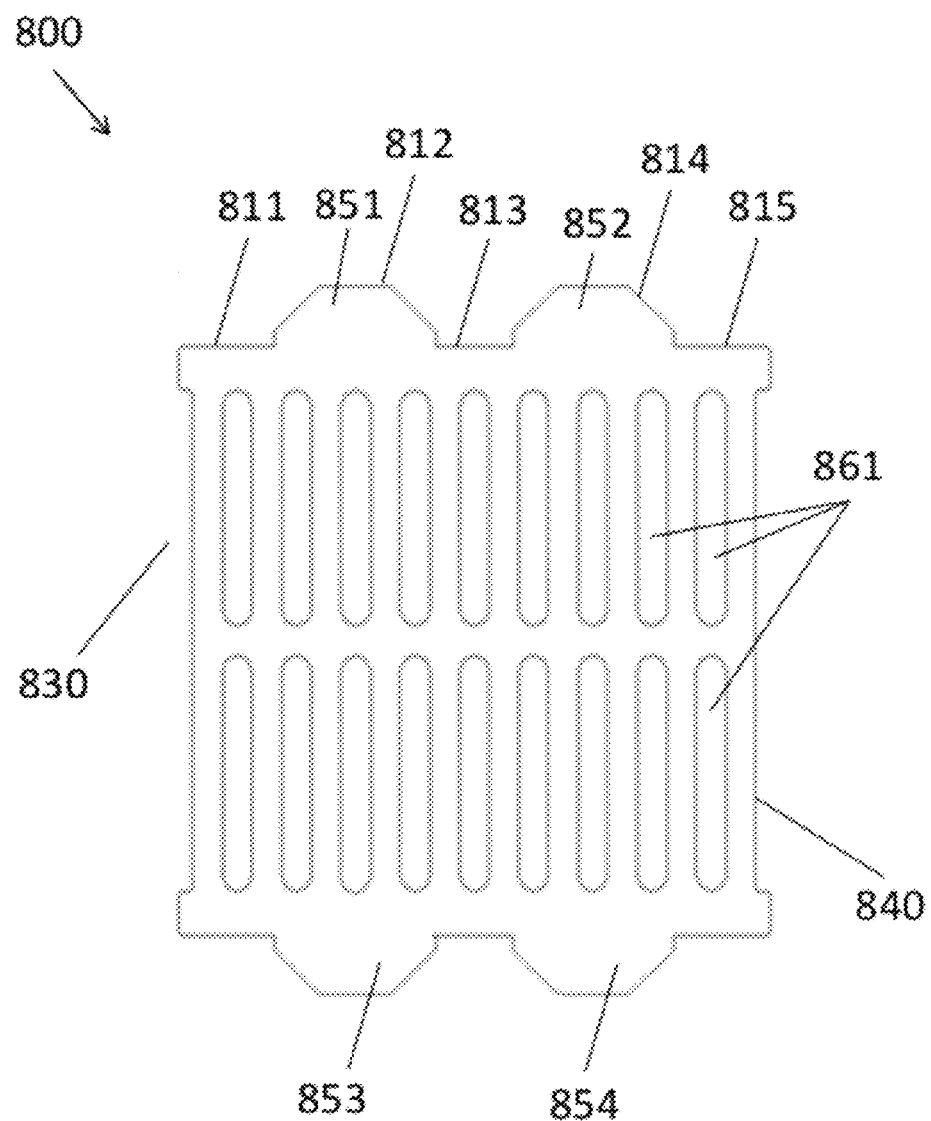
FIG. 8A is a side view of a cross plate or top grate.

The male side plate 600 can include one or more horizontal slots configured to receive a cross plate (see, e.g., the four-sided cross plate or top grate 800 illustrated in FIG. 8A). For example, the male side plate 600 includes a first horizontal slot 651 and a second horizontal slot 653. The horizontal and vertical extents of the horizontal slots can be adjusted depending on the height and width of mating tabs on the cross plate.

The male side plate 600 can include one or more locking tabs or locking tab slots disposed along the male side portions 630 or 640. In the example of FIG. 6A, each of the first and second male side portions 630 and 640 include respective locking tabs 660 and 662. The locking tabs 660 and 662 can be configured to be received in respective locking tab slots in adjacent side plates. In one example, the male side plate 600 can include only one locking tab. In another example, the male side plate 600 can include a locking tab on one of the male side portions (e.g., the male side portion 630), and the male side plate 600 can include a locking tab slot on the other male side portion (e.g., the male side portion 640).

Figure 6B:
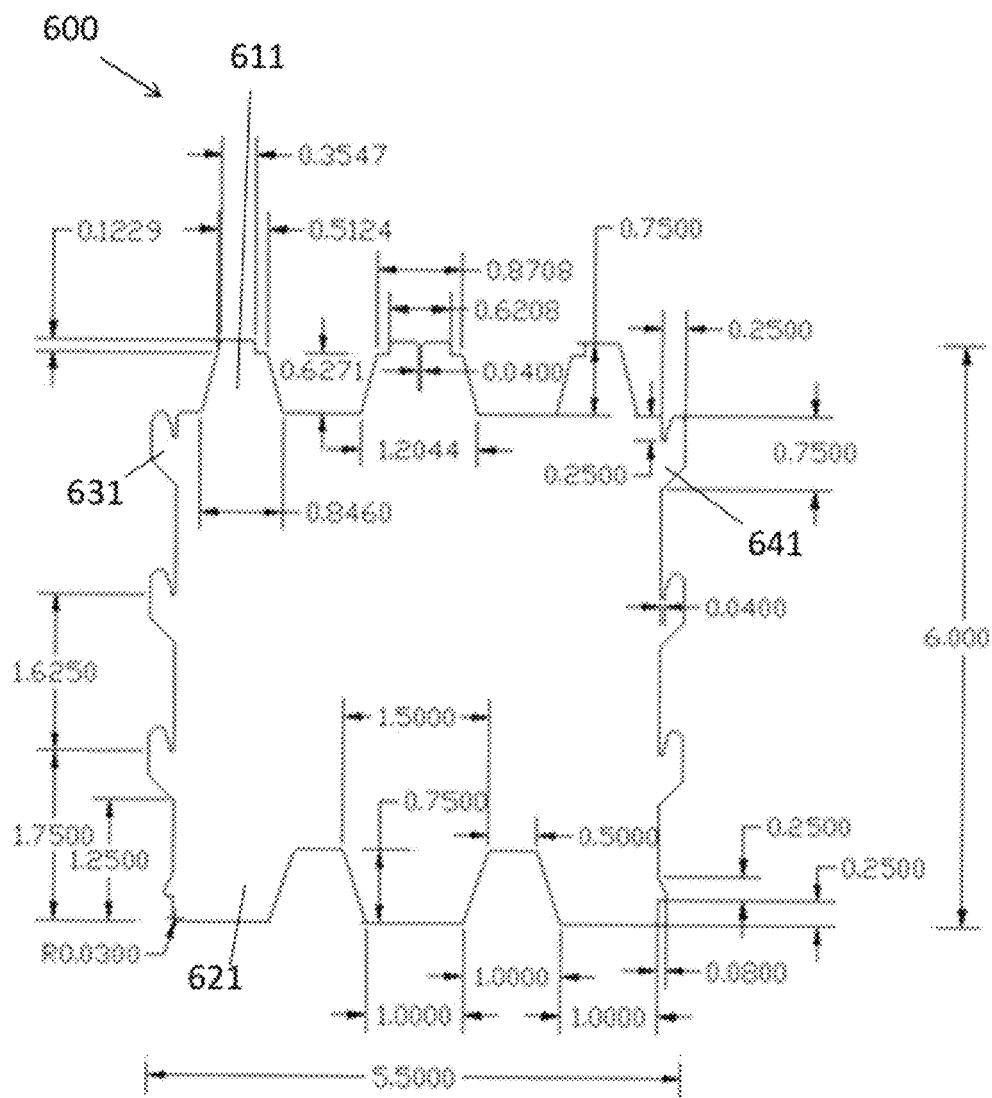
FIG. 6B is a side view of a male sidewall plate with example dimensions shown.

FIG. 6B illustrates generally an example of the male side plate 600, such as shown with example dimensions. For example, the vertical extents of the male side plate 600 can be about 6.0 inches apart, and the horizontal extents of the male side plate 600 can be about 5.5 inches apart. That is, the vertical dimension of the male side plate 600 can be about 6 inches from an edge of one of the upper extension features (e.g., the first extension 611) to an edge of one of the bottom extension features (e.g., the first foot 621). Similarly, the horizontal dimension of the male side plate 600 can be about 5.5 inches from an edge of one of the mating tabs (e.g., the first mating tab 631) to an edge of an opposing mating tab on the opposite side of the male side plate 600 (e.g., the mating tab 641). All dimensions shown are for example only. Other dimensions can be used. For example, the entire male side plate 600 can be scaled to be larger or smaller, or any one or more of the features of the side plate can be made larger or smaller. In an example, one or more of the mating or extension features can be made larger or smaller, such as to extend further or shorter in vertical or horizontal directions. The locking tabs can be made larger or smaller. Other configurations are possible as well. Among other possible dimensions, the dimensions illustrated in the example of FIG. 6B could similarly be applied to the corresponding features of the first side plate 100.

Figure 7A:
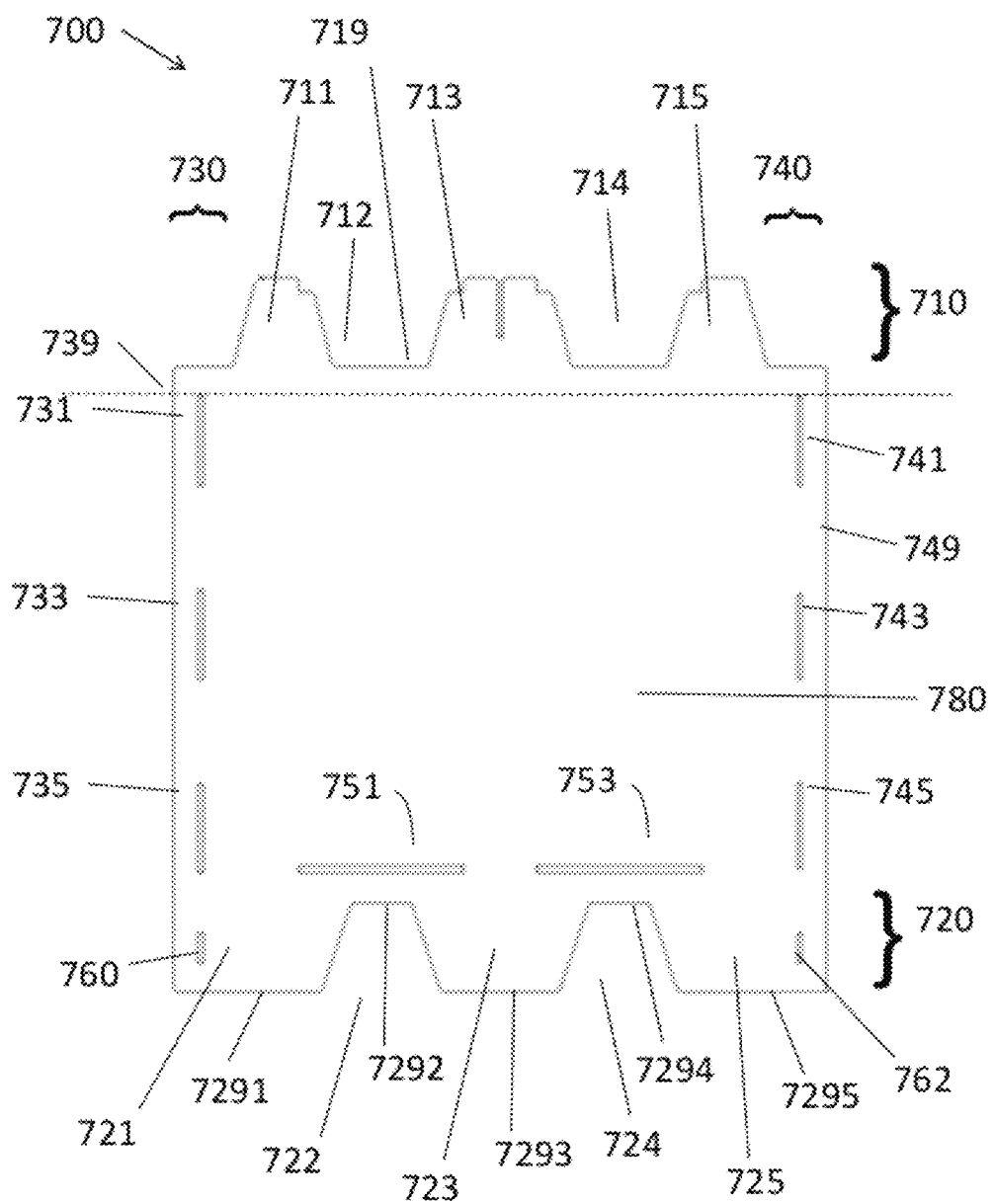
FIG. 7A is a side view of a female sidewall plate.

FIG. 7A illustrates generally an example of a female side plate 700, such as can be used as one of four side plates, or sidewalls, to form a four-sided collapsible enclosure. The female side plate 700 can include a top support portion 710, a bottom support portion 720, a first female side portion 730, a second female side portion 740, and a body portion 780.

The female side plate 700 can include first and second planar faces, and each of the top support portion 710, the bottom support portion 720, and the first and second side portions 730 and 740, can include respective side edges, such as can be substantially perpendicular to the first and second planar faces of the female side plate 700. For example, the top support portion 710 can include a top side edge surface 719, the first side portion 730 can include a first side edge surface 739, the second side portion 740 can include a second side edge surface 749, and the bottom support portion 720 can include a bottom side edge surface, such as can be substantially perpendicular to the planar surface of the body portion 780. Each of the top edge surfaces 719 and bottom side edge surfaces 7292 and 7294 can be considered to consist of multiple side edge surface portions. For example, the bottom side edge surface 729 can be considered to consist of multiple side edge surface portions, such as including a first bottom side edge surface portion 7291, a second bottom side edge surface portion 7292, and so on, as illustrated in FIG. 7A. Each of these side edge surface portions can together compose a continuous side edge surface.

In the example of FIG. 7A, the top support portion 710 can include a non-linear edge. The non-linear edge of the top support portion 710 can include, among other features, one or more extension or post features. For example, the top support portion 710 can include a first extension 711, a second extension 713, or a third extension 715. Any one or more of the extensions can extend away from the body portion 780. In one example, a first port 712 can be disposed between the first extension 711 and the second extension 713. A second port 714 can be disposed between the second extension 713 and the third extension 715. When the female side plate 700 is connected with other side plates, such as male side plates (e.g., male side plates according to the description of FIG. 6A), to form an enclosure, the first and second ports 712 and 714 can be configured as air ports, such as to maximize or control combustion within the enclosure. Additional features of the top support portion 710, such as including the several protrusions and recesses illustrated in FIG. 7A, can be substantially similar to those features as described above in the discussion of FIG. 1C, among other places throughout this document.

In the example of FIG. 7A, the bottom support portion 720 can include a non-linear edge. The non-linear edge of the bottom support portion 720 can include, among other features, a first foot 721, a second foot 723, or a third foot 725. In one example, a first port 722 can be disposed between the first foot 721 and the second foot 723. A second port 724 can be disposed between the second foot 723 and the third foot 725. When the female side plate 700 is connected with other side plates to form a fire-resistant enclosure, the first and second ports 722 and 724 can be configured as air ports, such as to maximize or control combustion within the enclosure in conjunction with the first and second ports 712 and 714.

In one example, any one or more of the side plate 100, the male side plate 600, or the female side plate 700 can include a linear edge. The linear edge can comprise all or a portion of the top or bottom support portions of the plates. That is, not every plate used in a particular fire-resistant, collapsible enclosure necessarily includes the non-linear edges of the top and bottom support portions illustrated in FIG. 1A, 1C, 6A, 6B, 7A, or 7B. At least one of the side plates can include a non-linear edge in a bottom support portion, and at least one of the side plates (e.g., the same or a different side plate) can include a non-linear edge in a top support portion, such that at least one port and one port are provided in a fully assembled enclosure. Accordingly, the size or number of inlet and ports of the fire-resistant, collapsible enclosure can be varied or tailored to suit various applications. For example, if the fire-resistant collapsible enclosure is going to be used outdoors on a windy day, one or more sides of the enclosure without inlet or ports may be selected such that there are no vents facing the direction of the wind. This can help to maintain an even, controlled combustion within the enclosure that can be used for cooking or other heating purposes.

In the example of FIG. 7A, the first side portion 730 can include one or more mating features configured to connect to an adjacent side plate. For example, the first side portion 730 can include a first mating slot 731. The first mating slot 731 can be a substantially rectangular, through-hole slot in the female side plate 700, and can be configured to receive a corresponding mating tab of an adjacent male side plate (e.g., the first mating tab 631 of the male side plate 600).

In the example of FIG. 7A, the first side portion 730 of the female side plate 700 can include additional mating slots, such as a second mating slot 733 or a third mating slot 735, disposed along a side of the female side plate 700. The first, second, and third mating slots 731, 733, and 735 can be similarly sized and shaped, or can be differently sized and shaped, corresponding to mating features in an adjacent side plate. In some examples, the mating slots can be differently shaped to achieve different degrees of connection security when the female side plate 700 is connected to one or more adjacent side plates.

In the example of FIG. 7A, the second side portion 740 can include similarly oriented, similarly sized, or similarly shaped mating features as in the first side portion 730. These mating features can be configured to connect to another adjacent side plate. For example, the second side portion 740 of the female side plate 700 can include first, second, and third mating slots 741, 743, and 745, which can be similarly sized and shaped. In one example, the mating features in the first and second side portions 730 and 740 can be mirror images of each other, such that for each mating feature in the first side portion 730, there is an equivalent mating feature in the second side portion 740, as shown in FIG. 7A. In an example, the mating features on each side of the female side plate 700 can be substantially vertically aligned as shown in the example of FIG. 7A.

The female side plate 700 can include one or more horizontal slots configured to receive a cross plate (see, e.g., the four-sided cross plate or top grate 800 illustrated in FIG. 8A). For example, the female side plate 700 includes a first horizontal slot 751 and a second horizontal slot 753. The horizontal and vertical extents of the horizontal slots can be adjusted depending on the height and width of mating tabs on the cross plate.

The female side plate 700 can include one or more locking tabs or locking tab slots disposed along the side portions 730 or 740. In the example of FIG. 7A, each of the first and second side portions 730 and 740 include respective locking tab slots 760 and 762. The locking tab slots 760 and 762 can be configured to receive respective locking tabs in adjacent side plates. In one example, the female side plate 700 can include only one locking tab slot. In another example, the female side plate 700 can include a locking tab on one of the side portions (e.g., the side portion 730), and the female side plate 700 can include a locking tab on the other side portion (e.g., the side portion 740).

Figure 7B:
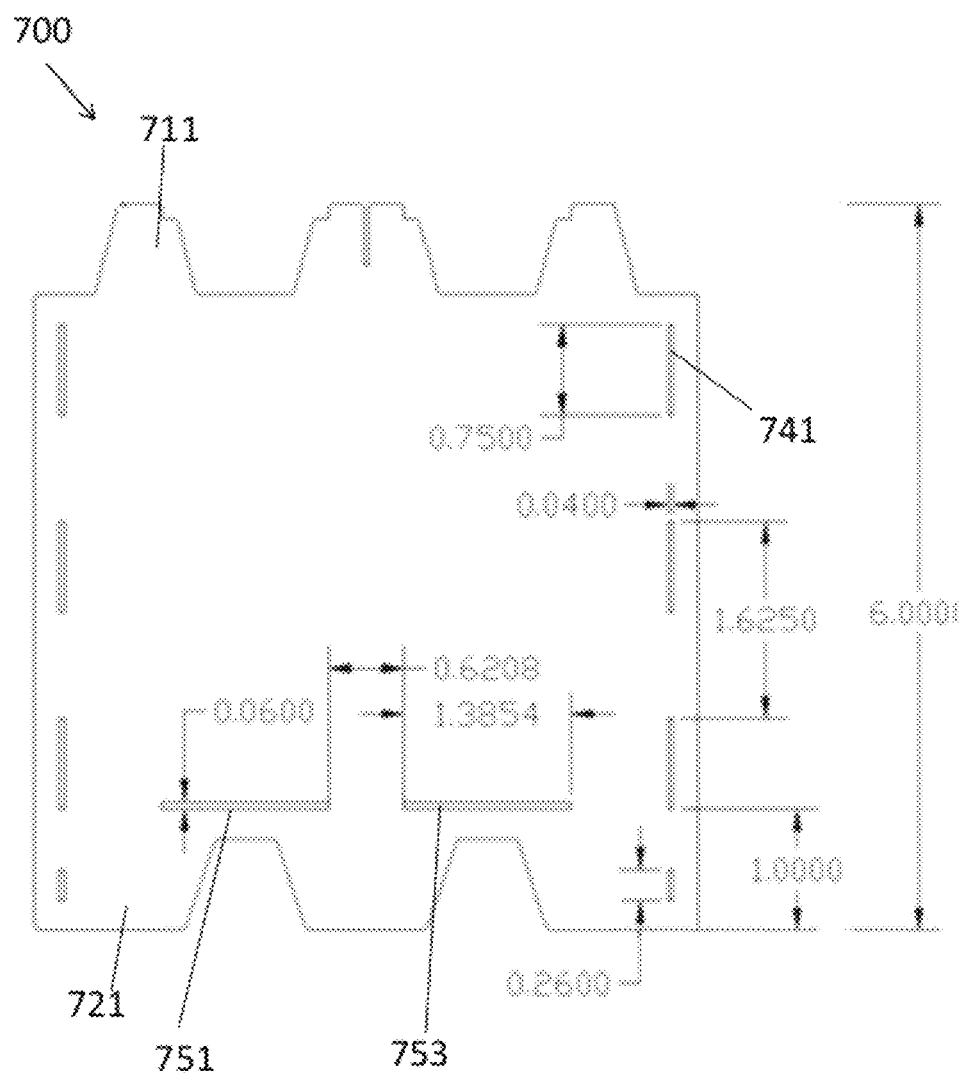
FIG. 7B is a side view of a female sidewall plate with example dimensions shown.

FIG. 7B illustrates generally an example of the female side plate 700 shown with example dimensions. For example, the vertical extents of the female side plate 700 can be about 6 inches apart, and the horizontal extents of the female side plate 700 can be about 5.5 inches apart. That is, the vertical dimension of the female side plate 700 can be about 6 inches from an edge of one of the upper extension features (e.g., the first extension 711) to an edge of one of the bottom extension features (e.g., the first foot 721). The example of FIG. 7B also illustrates example dimensions for the first and second horizontal slots 751 and 753, which can be configured to receive a cross plate (e.g., the four-sided cross plate or top grate 800 illustrated in FIG. 8A). These horizontal slots can be made larger than the mating tab slots, such as to accommodate a cross plate that is thicker than the sidewall plates. All dimensions shown are for example only. Other dimensions can be used. For example, the entire female side plate 700 can be scaled to be larger or smaller, or any one or more of the features of the side plate can be made larger or smaller. Accordingly, any mating side plates (e.g., the male side plate 600) can be similarly scaled to ensure that the various mating features correspond.

Figure 8B:
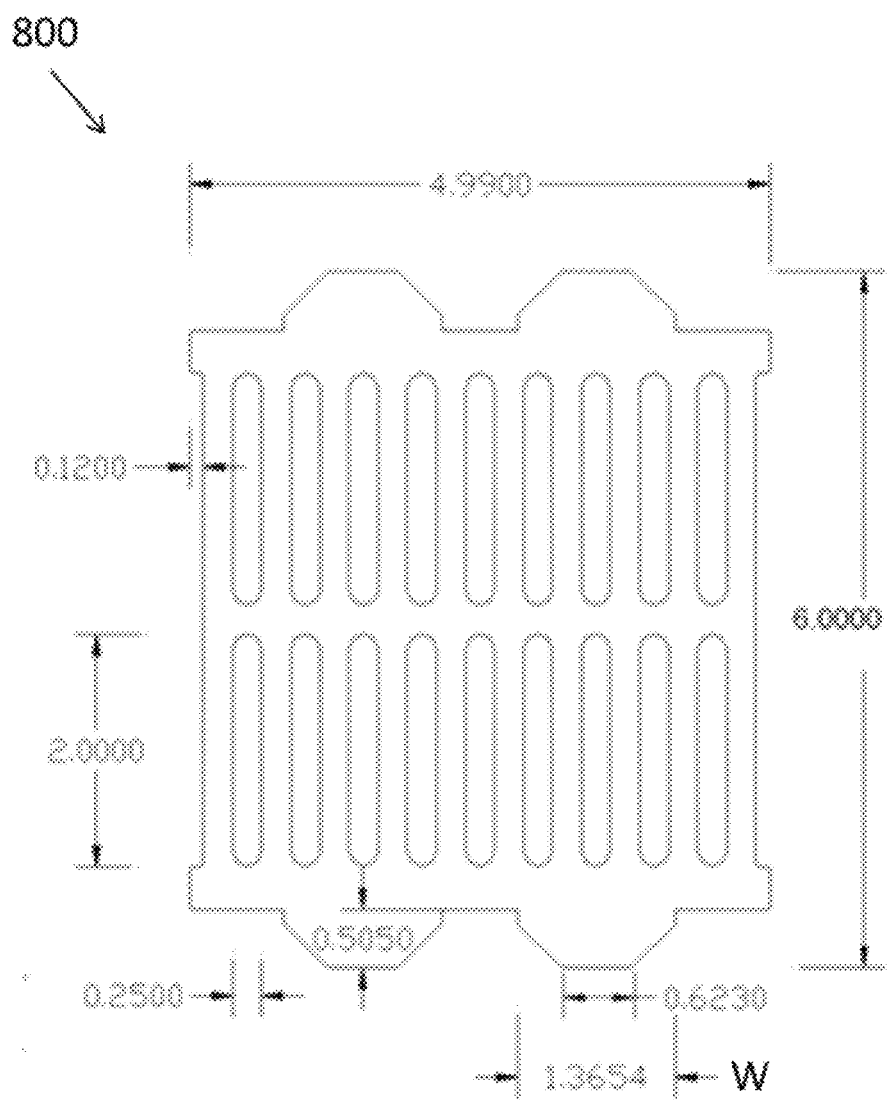
FIG. 8B is a side view of a cross plate or top grate with example dimensions shown.

FIG. 8A illustrates generally an example of a four-sided cross plate or top grate 800 configured for use with a four-sided rectangular enclosure. The cross plate or top grate 800 includes a non-linear edge, including one or more mating tabs. FIG. 8B illustrates example dimensions of the four-sided cross plate or top grate 800.

In the example of FIG. 8A, the cross plate or top grate 800 includes four mating tabs, including the first, second, third, and fourth mating tabs 851, 852, 853, and 854. In an example, the cross plate or top grate 800 can include multiple edge segments, including a first edge segment 811, a second edge segment 812, a third edge segment 813, and so on as illustrated in FIG. 8A. Ends of the multiple edge segments can coincide to form a continuous edge of the cross plate or top grate 800. The mating tabs 851, 852, 853, and 854 can be substantially the same shape, or can be differently shaped. In the example of FIG. 8B, the mating tabs 851, 852, 853, and 854 can each have a width W.

The cross plate or top grate 800 can include one or more mating tabs. The mating tabs can be configured to be received in one or more horizontal slots of the sidewall plates (e.g., the horizontal slot 151 of the first side plate 100, the horizontal slot 751 of the female side plate 700, etc.). In the example of FIG. 8A, the cross plate or top grate 800 can include mating tabs on at least two sides, such as on opposite sides. With mating tabs on opposite sides, the first and second mating tabs 851 and 852 can be configured to be received in the horizontal slots 751a and 752a of a first female side plate 700a, and the third and fourth mating tabs 853 and 854 can be configured to be received in the horizontal slots 751b and 752b of a second female side plate 700b, such as illustrated in the example enclosure shown in FIG. 10. In one example, the cross plate or top grate 800 could be rotated, and the pairs of mating tabs can be configured to be received in the horizontal slots of the male side plates, if available.

One or more sides of the cross plate or top grate 800 can be substantially linear, such as without any mating tabs or other mating features. For example, the cross plate or top grate 800 can include first and second substantially linear edges 830 and 840. These edges can be configured to be adjacent to an inner surface of two of the sidewalls of an assembled enclosure. For example, where the mating tabs 851, 852, 853, and 854 are mated with corresponding female side plates, the substantially linear edges 830 and 840 can be configured to be adjacent to an inner surface of respective male side plates, such as illustrated in the example enclosure in FIG. 10.

In an example where the cross plate or top grate 800 is configured as a cross plate to be disposed intermediately between top and bottom portions of the sidewalls of a collapsible enclosure, the first and second mating tabs 851 and 852 can be configured to mate with first and second horizontal slots of one or more of the first side plate 100, the male side plate 600, or the female side plate 700. The cross plate or top grate 800 can include more or fewer mating tabs as long as the mating side plate includes at least the same number of corresponding horizontal slots. The first, third, and fifth edge segments 811, 813, and 815, can be configured to engage at or against an inner wall of the body portion of the mating side plate, such as adjacent to the corresponding horizontal slots. In an example, the first, third, and fifth edge segments 811, 813, and 815 can be configured to be spaced apart from an inner wall surface of the body portion of the mating side plate.

In an example where the cross plate or top grate 800 is configured as a top grate to be disposed at or near a top portion of the sidewalls of a collapsible enclosure, the first and second mating tabs 851 and 852 of the cross plate or top grate 800 can be configured to mate with the top support portion of a side plate, such as at one or more recesses of the male side plate 600 or the female side plate 700. For example, the first, third, and fifth edge segments 811, 813, and 815, can correspond to a top support portion of a side plate (e.g., the top support portion 110 of the first side plate 100, the top support portion 610 of the male side plate 600, or the top support portion 710 of the female side plate 700).

In an example where the cross plate or top grate 800 is configured as a top grate to be used with a collapsible enclosure that comprises four of the first side plates 100, the first edge segment 811 can be configured to be disposed near, or engaged against, a side surface of the first protrusion 171. In an example, an interposing space can be disposed between the first edge segment 811 and the side surface of the first protrusion 171. Similarly, the third edge segment 813 can be configured to be disposed near, or engaged against, a side surface of the second protrusion 173. The fifth edge segment 815 can be configured to be disposed near, or engaged against, a side surface of the third protrusion 175. In one example, a top edge of at least one of the first protrusion 171, the second protrusion 173, or the third protrusion 175 can be configured to extend beyond an upper surface of the cross plate or top grate 800, such as when the cross plate or top grate 800 is coupled to the top support portion 110 of one or more of the side plates 100.

The four-sided cross plate or top grate 800 can include multiple though-hole slots 861. The multiple through-hole slots 861 can be configured such that the cross plate or top grate 800 includes a predetermined percentage of open (i.e., cutout or through-hole) area. For example, the cross plate or top grate 800 can be configured to have about 30 to 50 percent open area. When the cross plate or top grate 800 is used as a fuel-supporting plate, the multiple through-hole slots 861 allow air to circulate below and reach the bottom of the fuel source. When the cross plate or top grate 800 is used as a top grate, the multiple through-hole slots 861 permit heat or flames to penetrate directly through the top grate, such as to grill food or heat other items.

Figure 9:
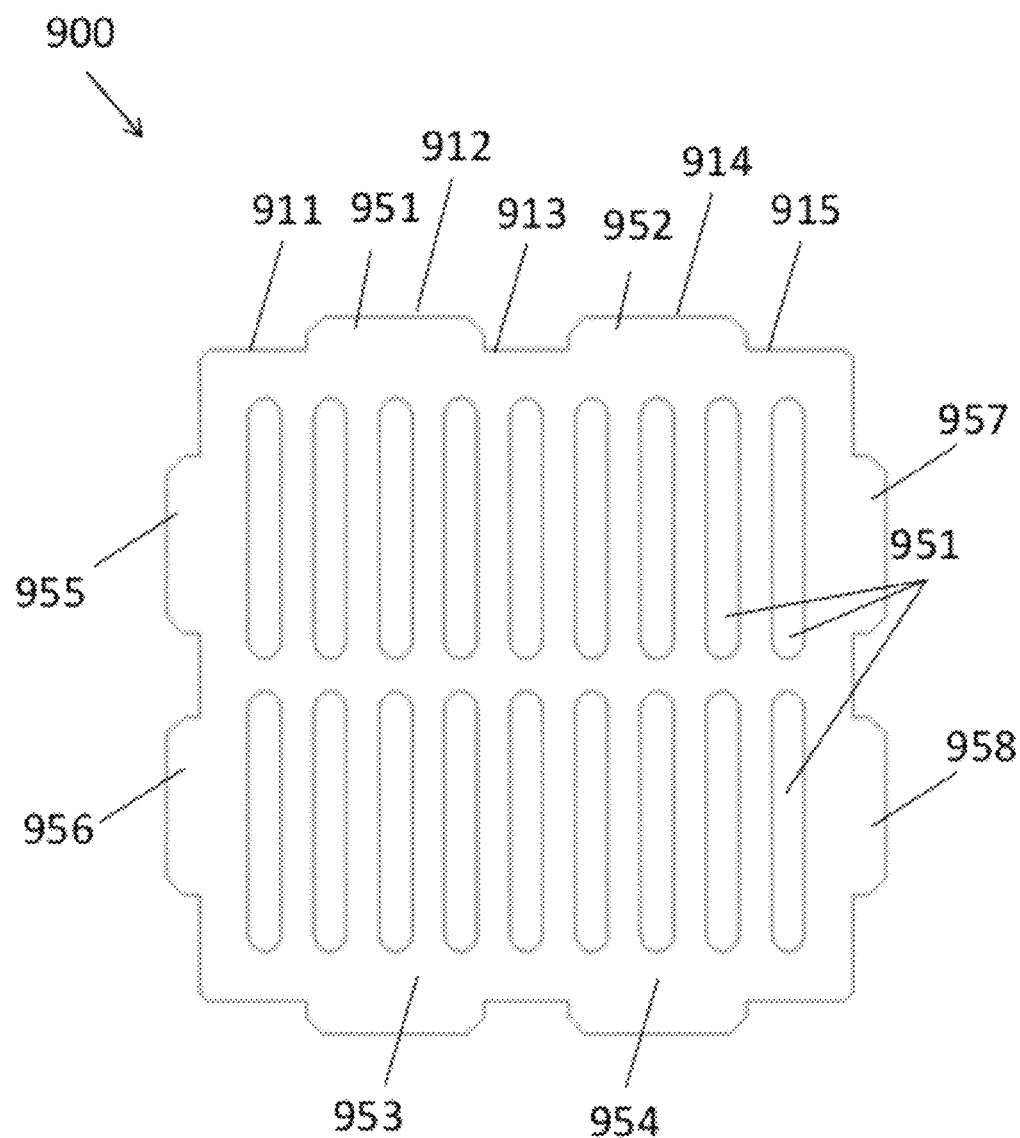
FIG. 9 is a side view of a cross plate or top grate.

FIG. 9 illustrates generally an example of a four-sided cross plate or top grate 900 configured for use with a four-sided rectangular enclosure. The cross plate or top grate 900 includes a non-linear edge which includes one or more mating tabs.

In the example of FIG. 9, the cross plate or top grate 900 includes eight mating tabs, including the first, second, third, fourth, fifth, sixth, seventh, and eighth mating tabs 951, 952, 953, 954, 955, 956, 957, and 958. In one example, the cross plate or top grate 900 can include multiple edge segments, such as including a first edge segment 911, a second edge segment 912, a third edge segment 913, and so on as illustrated in FIG. 9. Ends of the multiple edge segments can coincide to form a continuous edge of the cross plate or top grate 900.

Figure 10:
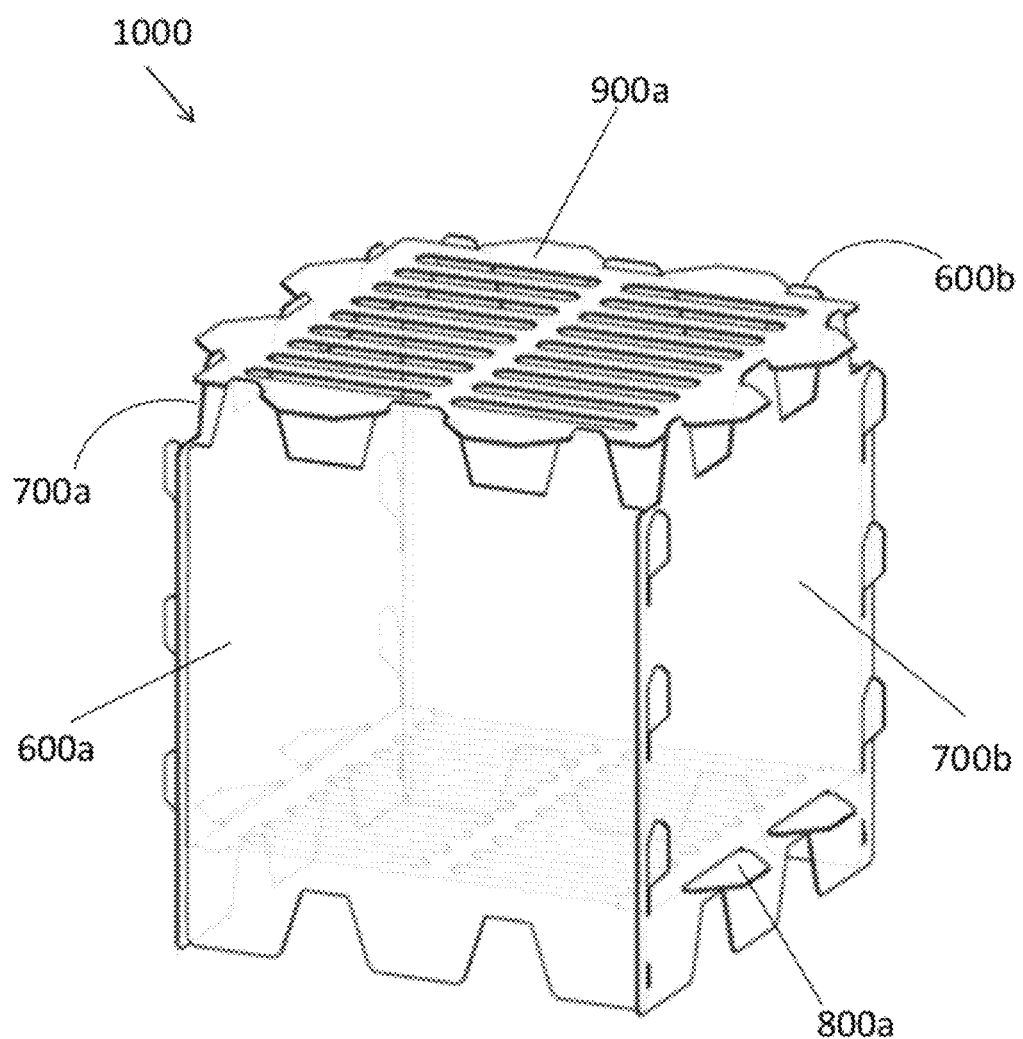
FIG. 10 is a perspective view of an assembled, fire-resistant, four-sided collapsible enclosure with a top grate.

The cross plate or top grate 900 can include one or more mating tabs. The mating tabs can be configured to be received in one or more horizontal slots of the sidewall plates (e.g., the horizontal slots 151 and 153 of the first side plate 100). In the example of FIG. 9, the cross plate or top grate 900 can include mating tabs on all four sides. For example, the first and second mating tabs 951 and 952 can be configured to be received in the horizontal slots 751a and 752a of a first female side plate 700a, and the third and fourth mating tabs 953 and 954 can be configured to be received in the horizontal slots 751b and 752b of a second female side plate 700b, such as illustrated in the example of FIG. 10. Similarly, the fifth and sixth mating tabs 955 and 956 can be configured to be received in the horizontal slots 651a and 652a of a first male side plate 600a, and the seventh and eighth mating tabs 957 and 958 can be configured to be received in the horizontal slots 651b and 652b of a second male side plate 600b.

In an example where the cross plate or top grate 900 is configured as a cross plate to be disposed intermediately between top and bottom portions of the sidewalls of a collapsible enclosure, the first and second mating tabs 951 and 952 can be configured to mate with first and second horizontal slots of one or more of the first side plate 100, the male side plate 600, or the female side plate 700. The cross plate or top grate 900 can include more or fewer mating tabs as long as the mating side plate includes at least the same number of corresponding horizontal slots. The first, third, and fifth edge segments 911, 913, and 915, can be configured to be disposed near or engaged against an inner wall surface of the body portion of the mating side plate, such as adjacent to the corresponding horizontal slots. In an example, the first, third, and fifth edge segments 911, 913, and 915 can be configured to be spaced apart from an inner wall surface of the body portion of the mating side plate.

In an example where the cross plate or top grate 900 is configured as a top grate to be disposed at or near a top portion of the sidewalls of a collapsible enclosure, the first and second mating tabs 951 and 952 of the cross plate or top grate 900 can be configured to mate with the top support portion of a side plate, such as at first and second recesses of at least one of the male side plate 600 or the female side plate 700. For example, the first, third, and fifth edge segments 911, 913, and 915, can correspond to a top support portion of a side plate (e.g., the top support portion 110 of the first side plate 100, the top support portion 610 of the male side plate 600, or the top support portion 710 of the female side plate 700).

In an example where the cross plate or top grate 900 is configured as a top grate to be used with a collapsible enclosure that comprises four of the first side plates 100, the first edge segment 911 can be configured to engage at or against a side surface of the first protrusion 171. In one example, an interposing space can be disposed between the first edge segment 911 and the side surface of the first protrusion 171. Similarly, the third edge segment 913 can be configured to be disposed near, or engaged against, a side surface of the second protrusion 173, or the fifth edge segment 915 can be configured to be disposed near, or engaged against, a side surface of the third protrusion 175. A top edge of at least one of the first protrusion 171, the second protrusion 173, or the third protrusion 175, can be configured to extend beyond an upper surface of the cross plate or top grate 900, such as when the cross plate or top grate 900 is coupled to the top support portion 110 of one or more of the side plates 100.

The four-sided cross plate or top grate 900 can include multiple though-hole slots 951. The multiple through-hole slots 951 can be configured such that the cross plate or top grate 900 includes a predetermined percentage of open (i.e., cutout or through-hole) area. For example, the cross plate or top grate 900 can be configured to have about 30 to 50 percent open area. When the cross plate or top grate 900 is used as a fuel-supporting plate, the multiple through-hole slots 951 permit air to circulate below and reach the bottom of the fuel source. When the cross plate or top grate 900 is used as a top grate, the multiple through-hole slots 951 permit heat or flames to penetrate directly through the top grate, such as to grill food or heat other items.

FIG. 10 illustrates generally an example of an assembled, four-sided, fire-resistant collapsible enclosure 1000. The four-sided collapsible enclosure 1000 can include first and second male side plates 600a and 600b (e.g., such as can be provided according to the male side plate 600 of FIG. 6A), first and second female side plates 700a and 700b (e.g., such as can be provided according to the female side plate 700 of FIG. 7A), and, optionally, at least one of a cross plate 800a (e.g., such as can be provided according to the cross plate or top grate 800 of FIG. 8A), or a top grate 900a (e.g., such as can be provided according to the cross plate or top grate 900 of FIG. 9).

In the example of FIG. 10, each of the mating tab features of the first and second male side plates 600a and 600b can be mated with corresponding mating tab slots in the first and second female side plates 700a and 700b. As shown, the side plates can be further secured using one or more locking tabs and locking tab slots, such as using the locking tabs in the first and second male side plates 600a and 600b, and the locking tab slots in the first and second female side plates 700a and 700b.

The cross plate 800a can be used with the enclosure 1000. The first and second female side plates 700a and 700b can include horizontal slots configured to receive mating tabs of the cross plate 800a. As shown, the mating tabs of the cross plate 800a can extend through the side plates; however, other mating tab designs are possible, such as a mating tab that, when mated with a corresponding side plate, is flush with an outer planar surface of the side plate. A cross plate having mating tabs disposed along more than two edges (e.g., along all four edges) can also be used, such as when each of the side plates of the enclosure 1000 includes appropriately configured horizontal slots.

The top grate 900a can be included with the enclosure 1000. Top edges of one or more of the side plates can be configured to receive the top grate 900a. For example, a bottom surface of the top grate 900a can rest on recesses disposed along the non-linear top edges of one or more of the side plates. In an example, one or more protrusions of the side plates can extend vertically above a top surface of the top grate 900a, to help retain the top grate 900a on the enclosure 1000 during use.

In one example, the air port areas, and the enclosure volume or enclosure area of the enclosure 1000 can be selected using the relationships identified above in the discussion of FIG. 4.

The four-sided, fire-resistant collapsible enclosure 1000 can be assembled as follows. The first male side plate 600a can be secured to the first female side plate 700a by inserting the male mating tab features into the corresponding mating tab slots, e.g., 731. The first male side plate 600a can be laterally shifted relative to the first female side plate 700a, such as to secure a body portion of the first female side plate 700a in a tapered mating tab slot of the male side plate 600a. If present, a locking tab, e.g., 660 on the first male side plate 600a can be inserted into a locking tab slot, e.g., 760 on the first female side plate 700a when the plates are laterally shifted.

The second male side plate 600b can be secured to the assembled first male side plate 600a and first female side plate 700a. Mating tabs, e.g., 631 in the second male side plate 600b can be joined with mating tab slots, e.g., 731 disposed along an opposite side of the first female side plate 700a by laterally shifting the second male side plate 600b relative to the first female side plate. At this point, a three-sided partial enclosure is formed. The cross plate 800a can be provided. It can be attached to the first female side plate 700a by inserting the mating tabs of the cross plate 800a in the horizontal slots of the first female side plate 700a. The other mating tabs of the cross plate 800a can then be inserted into the second female side plate 700b while the mating tab slots of the second female side plate 700b are joined with the mating tabs of the first and second male side plates 600a and 600b. The second female side plate 700b can then be shifted relative to the three-sided partial enclosure, for example, downward. A body portion of the second female side plate 700b can be drawn into the tapered slots of the mating tabs of the first and second male side plates 600a and 600b. The bottom support portion 720 of the second female side plate 700b can be slightly flexed away from the enclosure as an inner planar surface of the second female side plate 700b interferes with one or more locking tabs in one or more of the first and second male side plates 600a and 600b. When the second female side plate 700b is fully shifted relative to the partial enclosure, the one or more locking tabs, e.g., 631 can be seated in corresponding locking tab slots, e.g., 731 on the second female side plate 700b. At this point, a five-sided enclosure is provided, including four side walls and a cross plate. The enclosure is substantially "locked" together because the one or more locking tabs prevent the side plates from shifting relative to each other. The top grate 900a can be placed on top of the enclosure. The various tabs or extension features of the top grate 900a can be mated with corresponding recesses along a top edge portion of the side plates 719. In some examples, the top grate 900a can be friction-fit against the side walls. That is, the top portions of at least two opposing side walls can be slightly flexed away from the enclosure when the top grate 900a is seated, and, when relaxed, the side walls can rigidly secure the top grate 900a using a slight friction-fit or interference-fit.

Other methods or sequences of assembly can also be performed. In some examples, the order of assembly can be changed to accommodate various features of the constituent side plates, cross plates, or top grates. For example, if a cross plate having mating tabs on three or more sides is used, it will have to be inserted into a partial enclosure before a third side plate is attached.

Figure 11:
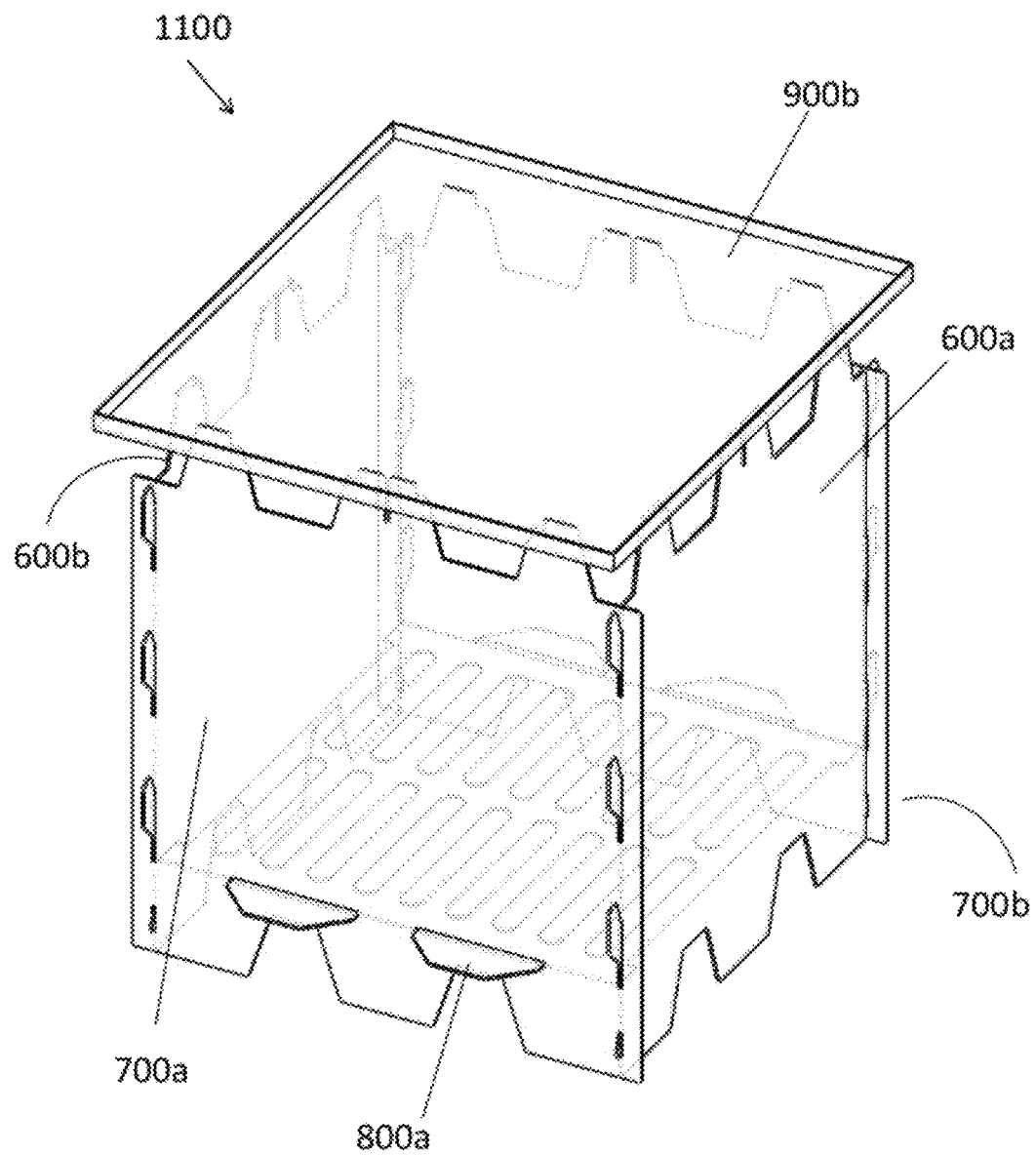
FIG. 11 is a perspective view of an assembled, fire-resistant, four-sided collapsible enclosure with a top plate.

FIG. 11 illustrates generally an example of an assembled, four-sided, fire-resistant collapsible enclosure 1100. The 4-sided collapsible enclosure 1100 can include first and second male side plates 600a and 600b (e.g., such as can be provided according to the male side plate 600 of FIG. 6A), first and second female side plates 700a and 700b (e.g., such as can be provided according to the female side plate 700 of FIG. 7A), a top plate 900b, and, optionally, a cross plate 800a (e.g., such as can be provided according to the cross plate or top grate 800 of FIG. 8A).

The top plate 900b can be a substantially flat plate or pan, such as can be configured for preparing food. The top plate 900b can be disposed on top of a top support portion of one or more of the side plates of the enclosure 1100. A bottom portion of the top plate 900b can include recesses or divots configured to receive a top edge of one or more of the side plates, so as to securely hold the top plate 900b to the enclosure 1100. For example, the recesses or divots can prevent the top plate 900b from shifting during use, such as when a user attempts to push heated food across the surface of the top plate 900b using a utensil. The top plate 900b can comprise a substantially solid, food-safe upper surface that can be flat, ridged, or otherwise textured. For example, the surface could be flat and stainless steel or could comprise a non-stick cooking surface.

Figure 12:
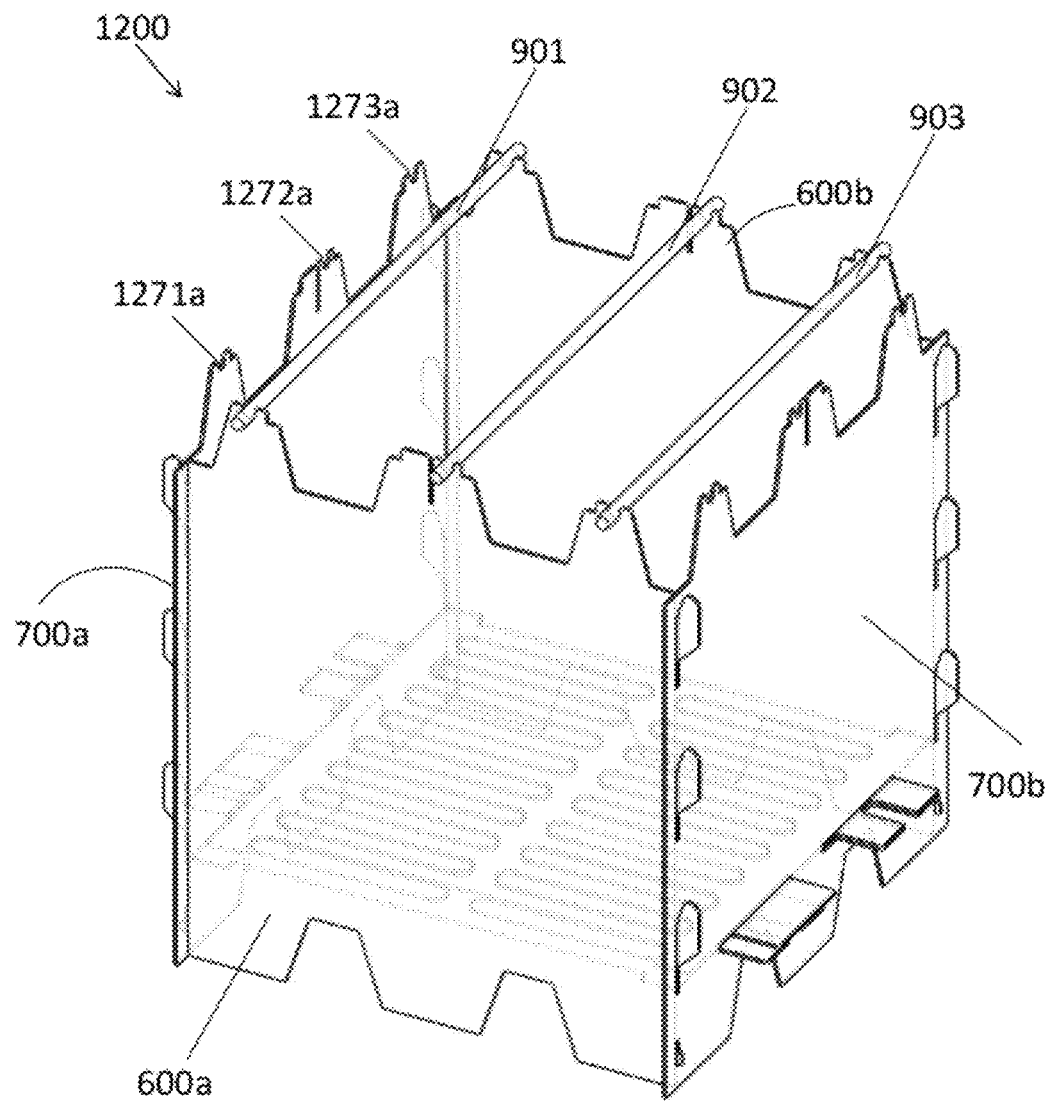
FIG. 12 is a perspective view of an assembled, fire-resistant, four-sided collapsible enclosure with several top support rods.

Other top support features can also be used. For example, FIG. 12 illustrates generally an enclosure 1200 that includes first, second, and third support rods 901, 902, and 903. The support rods 901, 902, and 903 can extend substantially across a top, open surface of the enclosure 1200, such as to provide a support surface that is substantially open and will not interfere with heat output from a fuel source disposed within the enclosure 1200. Cups, skewers, or other small objects can be supported by the support rods.

One or more of the side plates of the enclosure 1200 can be modified to accommodate the support rods. For example, top edge portions of each of the male and female side plates 600a, 600b, 700a, and 700b can be modified by providing a cutout that substantially matches the profile of the support rods. In the example of FIG. 12, the support rods are round, and the side plates each include semi-circular cutouts in their top edge portions. For example, the first female side plate 700a includes first, second, and third semi-circular cutouts 1271a, 1272a, and 1273a. The support rods could be other shapes as well, such as rectangular. In one example, only one side plate of the enclosure can include the one or more cutouts to receive one or more support rods. Ends of the support rods not received by the cutouts can rest on top of another of the side plates. In some examples, the cutouts can be substantially deep such that, when installed, the top edges of the support rods are substantially flush with the top edges of the side plates. In this case, a larger object can be in surface contact with the support rods and the top edges of the side plates for maximum support.

Figure 13A:
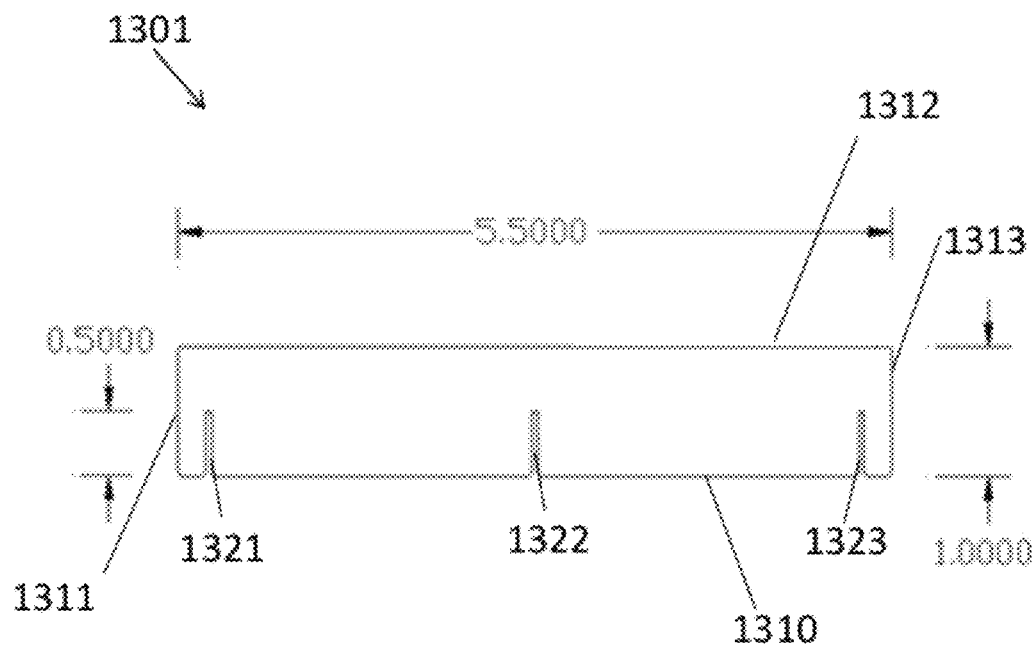
FIG. 13A is a side view of a first spanning member.
Figure 13B:
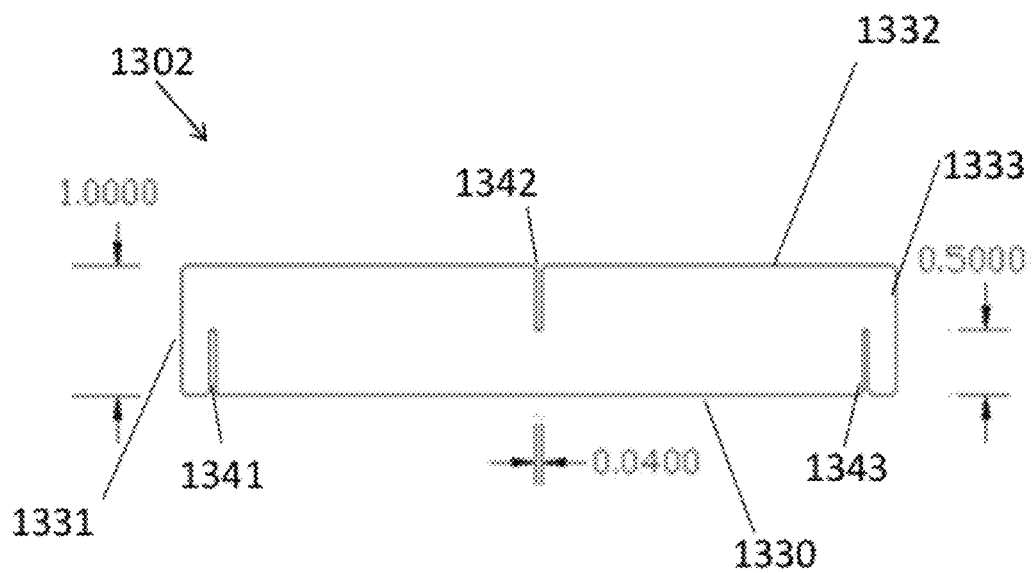
FIG. 13B is a side view of a second spanning member.

Referring now to FIGS. 13A and 13B, another top support feature can include a cross member comprising first and second substantially rectangular, substantially plate-like spanning members. The cross member can include a first substantially rectangular spanning member 1301, shown in FIG. 13A, having first and second horizontal edges 1310 and 1312, and first and second vertical edges 1311 and 1313. The first spanning member 1301 can include first, second, and third slots 1321, 1322, and 1323 that can extend inward from the first horizontal edge 1310. The first slot 1321 can be disposed adjacent the first vertical edge 1311, and the third slot 1323 can be disposed adjacent the second vertical edge 1313. The second slot 1322 can be disposed in a central portion of the first spanning member 1301 and can extend inward from the first horizontal edge 1310.

The second spanning member 1302, shown in FIG. 13B, can include first and second horizontal edges 1330 and 1332, and first and second vertical edges 1331 and 1333. The second spanning member 1302 can include first and third slots 1341 and 1343 that can extend inward from the first horizontal edge 1330. The second spanning member 1302 can include a second slot 1342 that can extend inward from the second horizontal edge 1332. The second slot 1341 can be disposed adjacent the first vertical edge 1331, and the third slot 1343 can be disposed adjacent the second vertical edge 1333. The second slot 1342 can be disposed in a central portion of the first spanning member 1302.

Figure 13C:
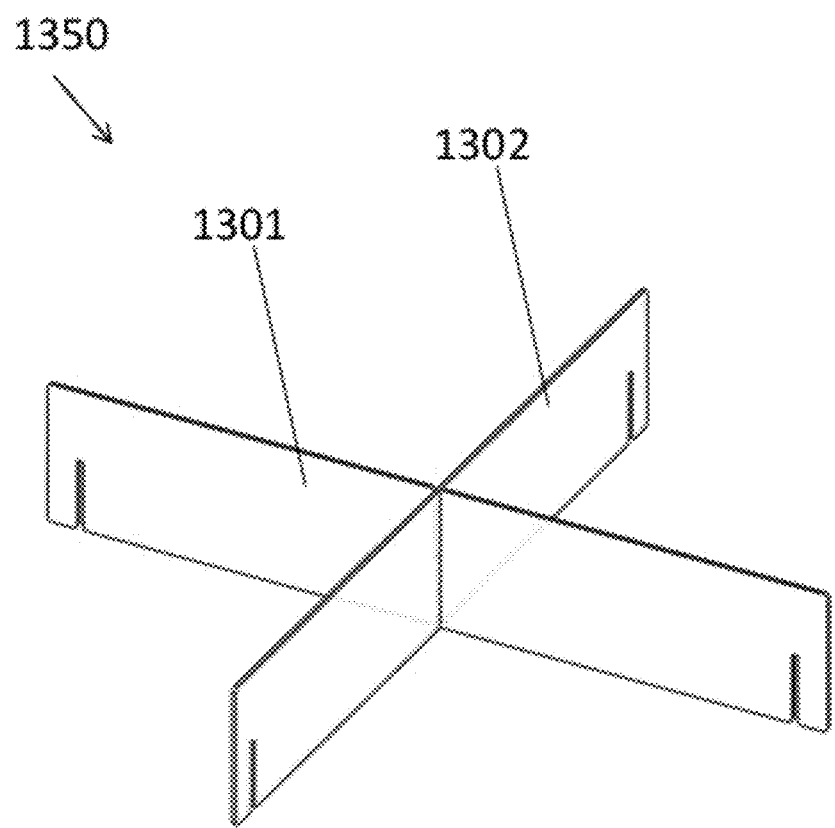
FIG. 13C is a perspective view of an assembled cross member.

FIG. 13C illustrates generally an example of an assembled cross member 1350 comprising the first and second substantially rectangular spanning members 1301 and 1302. As shown, the second slot 1322 of the first spanning member 1301 can be mated with the second slot 1342 of the second spanning member 1302 to form the cross member 1350.

Figure 14:
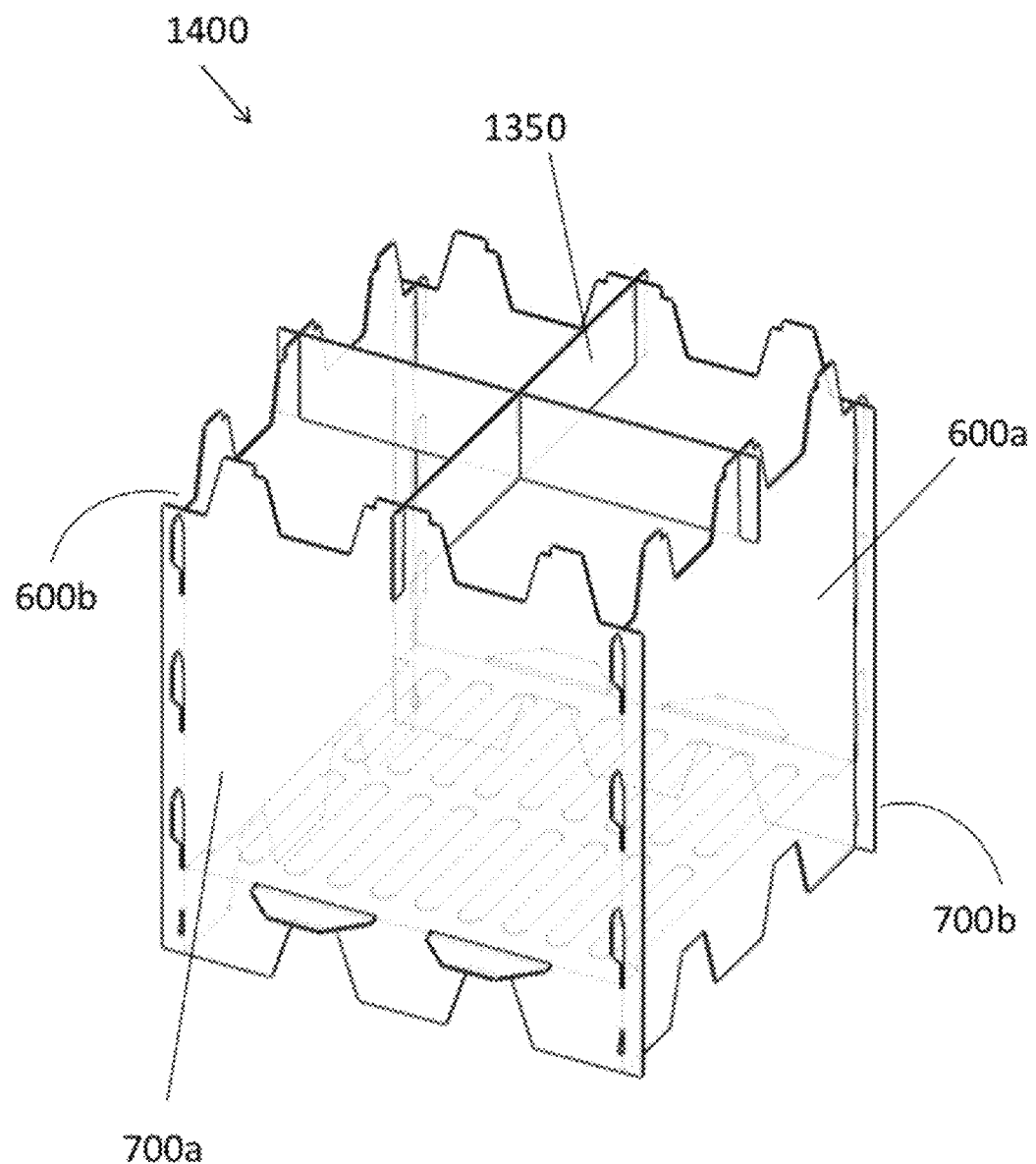
FIG. 14 is a perspective view of an assembled, fire-resistant, four-sided collapsible enclosure with a cross member.

FIG. 14 illustrates generally a fire-resistant collapsible enclosure 1400 that can include the cross member 1350. In an example, each side plate can include a slot in an extension feature that is centrally-located in the top support portion of the side plate. The slots in the top support portions of the male side plates 600a and 600b can be configured to receive the first and third slots of at least one of the first or second spanning members (e.g., the slots in the top support portions can be configured to receive the first and third slots 1321 and 1323 of the first spanning member 1301). The slots in the top support portions of the female side plates 700a and 700b can be configured to receive the first and third slots of the other of the first or second spanning members (e.g., the slots in the top support portions can be configured to receive the first and third slots 1331 and 1333 of the second spanning member 1302).

In some examples, only one of the first or second spanning members 1301 or 1302 can be used. In some examples, one or more of the spanning members can be configured to mate with slots in the top support portions of adjacent plates. For example, a spanning member could be configured to mate with a slot in the top support portion of the male side plate 600a and with a slot in the top support portion of the female side plate 700a (see, e.g., the example illustrated in FIG. 5).

Figure 15:
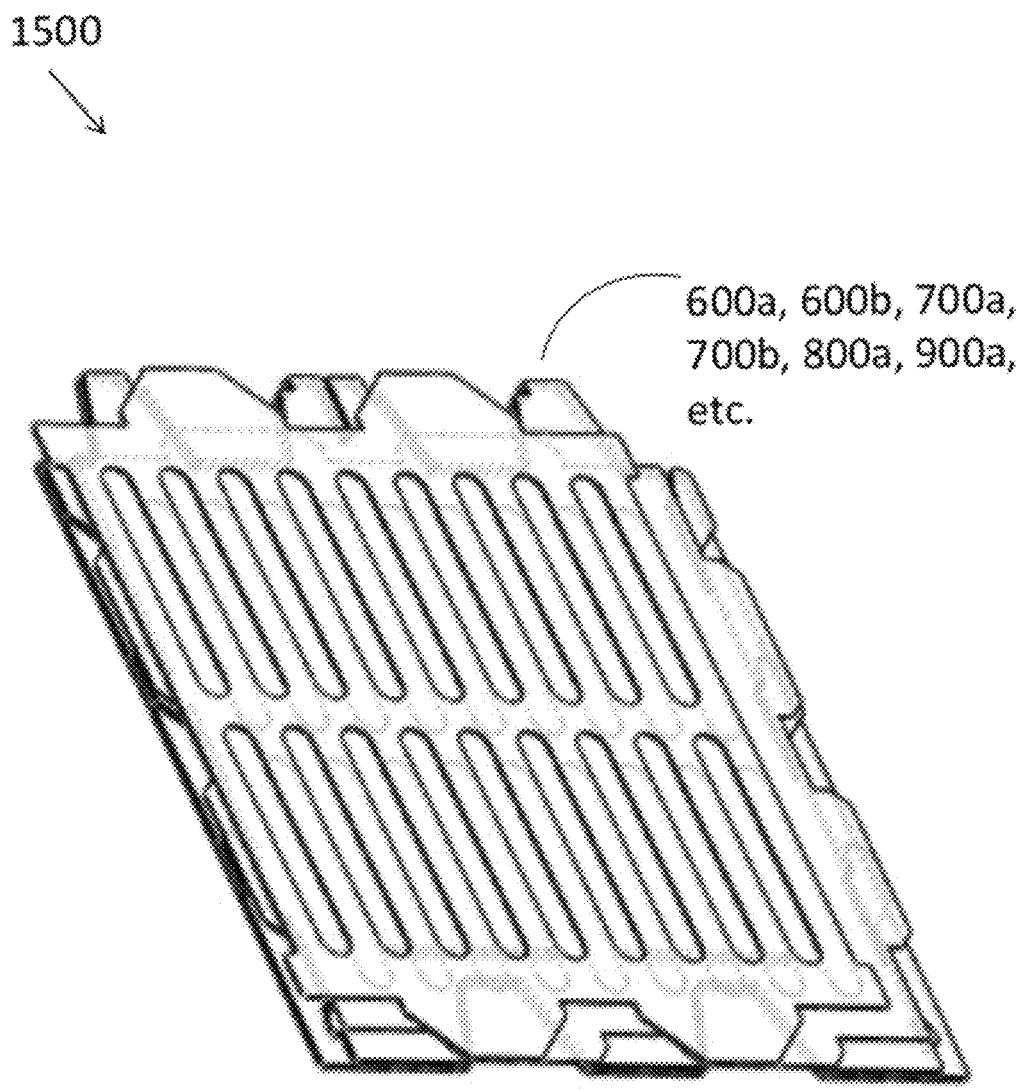
FIG. 15 is a perspective view of a disassembled and stacked enclosure.

Any of the enclosures 300, 400, 500, 1000, 1100, 1200, or 1400, among others, can be disassembled and the constituent plates of the enclosures can be stacked, such as for convenient storage or transportation. FIG. 15 illustrates generally a perspective view of a disassembled and stacked fire-resistant collapsible enclosure 1500. In the example of FIG. 15, the constituent plates of the enclosure are stacked, including the first and second male side plates 600a and 600b, the first and second female side plates 700a and 700b, the cross plate 800a, and the top grate 900a. An envelope, bag, or other carrying case, can be provided for storing a disassembled and stacked enclosure. In an embodiment, the disassembled and stacked fire-resistant collapsible enclosure 1500 can weigh less than about 2.5 pounds, making it easily transportable.

In some examples, additional airflow control may be desired, such as in addition to the airflow control provided by the air ports (e.g., air inlet and outlet ports). Additional airflow control can be provided using an airflow throttle.

Figure 16:
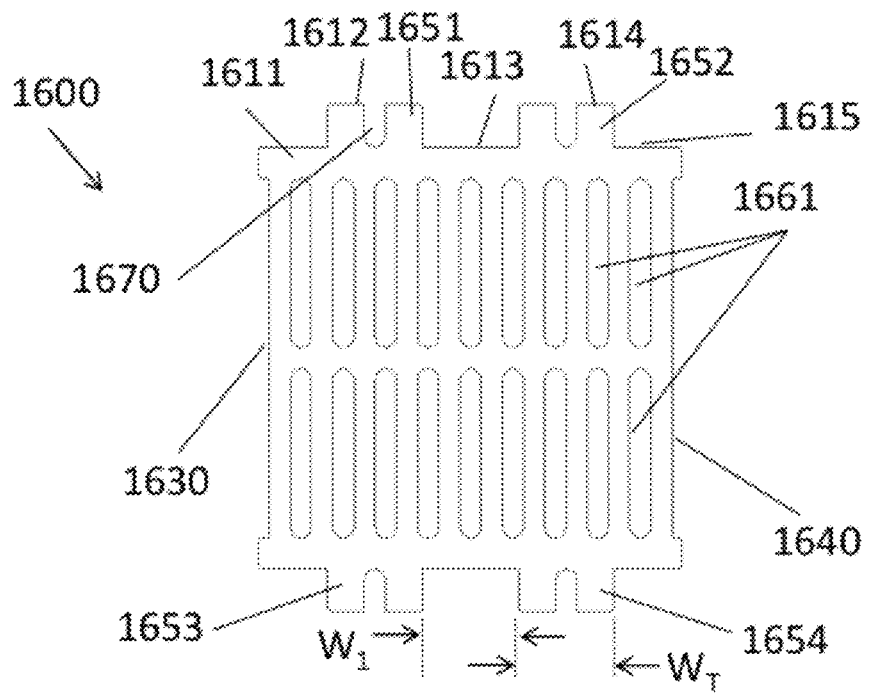
FIG. 16 is a side view of a first throttle plate.
Figure 17:
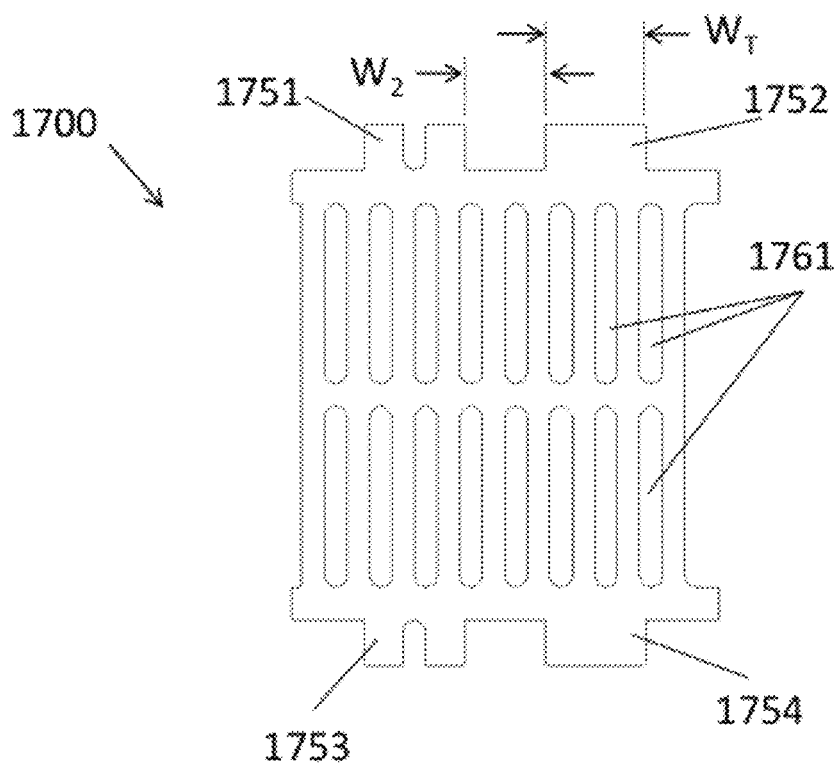
FIG. 17 is a side view of a second throttle plate.

FIG. 16 illustrates generally an example of a first throttle plate 1600. FIG. 17 illustrates generally an example of a second throttle plate 1700, such as can be used in combination with the first throttle plate 1600 to create an airflow throttle and control airflow through a fire-resistant collapsible enclosure (e.g., the enclosure 1000). The first and second throttle plates 1600 and 1700 can be used in combination instead of or in addition to the cross plate 800a. The first and second throttle plates 1600 and 1700 can be substantially similar to the cross plate or top grate 800, for example, including a non-linear continuous edge or one or more mating tabs.

In the example of FIG. 16, the first throttle plate 1600 includes four mating tabs, including the first, second, third, and fourth mating tabs 1651, 1652, 1653, and 1654. The first throttle plate 1600 can include multiple edge segments, such as including a first edge segment 1611, a second edge segment 1612, a third edge segment 1613, and so on as illustrated in FIG. 16. The mating tabs 1651, 1652, 1653, and 1654 can be substantially the same shape, as shown, or can be differently shaped. The mating tabs 1651, 1652, 1653, and 1654 can all have a width $W_T$, which can be less than the width W of the mating tabs of the cross plate or top grate 800 or less than the width of the horizontal slots in the sidewall plates. In one example, one or more of the mating tabs 1651, 1652, 1653, or 1654 can include a throttle status indicator 1670, which can include a U-shaped, circular, or other shaped cutout, or some other indicia, such as can be printed on or otherwise emblazoned on the mating tab.

The mating tabs of the first throttle plate 1600 can be configured to be received in one or more horizontal slots of the sidewall plates (e.g., the horizontal slot 151 of the first side plate 100). In the example of FIG. 16, the first throttle plate 1600 can include mating tabs on at least two sides, such as on opposite sides. For example, the first and second mating tabs 1651 and 1652 can be configured to be received in the horizontal slots 751a and 752a of a first female side plate 700a, and the third and fourth mating tabs 1653 and 1654 can be configured to be received in the horizontal slots 751b and 752b of a second female side plate 700b.

One or more sides of the first throttle plate 1600 can be substantially linear, such as without any mating tabs or other mating features. For example, the first throttle plate 1600 can include first and second substantially linear edges 1630 and 1640. These edges can be configured to be adjacent to an inner surface of two opposite sidewalls of an assembled enclosure. For example, where the mating tabs 1651, 1652, 1653, and 1654 are mated with corresponding female side plates, the substantially linear edges 1630 and 1640 can be configured to be adjacent to an inner surface of respective male side plates.

In an example where the first throttle plate 1600 is configured as a cross plate to be disposed intermediately between top and bottom portions of the sidewalls of a collapsible enclosure, the first and second mating tabs 1651 and 1652 can be configured to mate with first and second horizontal slots of one or more of the first side plate 100, the male side plate 600, or the female side plate 700. The first throttle plate 1600 can include more or fewer mating tabs as long as the mating side plate includes at least the same number of corresponding horizontal slots. The first, third, and fifth edge segments 1611, 1613, and 1615, can be configured to engage with or against an inner wall of the body portion of the mating side plate, such as adjacent to the corresponding horizontal slots. In one example, the first, third, and fifth edge segments 1611, 1613, and 1615 can be configured to be spaced apart from an inner wall of the body portion of the mating side plate.

The first throttle plate 1600 can include multiple though-hole slots 1661. The multiple through-hole slots 1661 can be configured such that the first throttle plate 1600 includes a predetermined percentage of open (i.e., cutout or through-hole) area. For example, the first throttle plate 1600 can be configured to have about 30 to 50 percent open area.

FIG. 17 illustrates generally the second throttle plate 1700, such as can have substantially the same features and dimensions as the first throttle plate 1600, as shown, including similar mating tabs and similar through-hole slots. Importantly, at least one of the mating tabs of the second throttle plate 1700 can differ from the first throttle plate 1600, such as by omitting a throttle status indicator, or including a throttle status indicator that is different than the indicator included on the first throttle plate 1600.

The first and second throttle plates 1600 and 1700 can be stacked and used in place of or in addition to the cross plate 800a in the enclosure 1000. The mating tabs of the first and second throttle plates 1600 and 1700 can be mated with the horizontal slots of the first and second female side plates 700a and 700b, respectively. In one example, a width of the horizontal slots can be about 1.4 inches, and the horizontal slot can be configured to receive a mating tab having a maximum width of about W (e.g., about 1.37 inches, as illustrated in FIG. 8B). In one example, the first and second throttle plates 1600 and 1700 can include one or more mating tabs (e.g., one or more of the mating tabs 1651, 1652, 1653, 1654, 1751, 1752, 1753, and 1754), such that each can have a maximum width of about $W_T$, where $W_T$ is less than W. In addition, a width between mating tabs can differ between the first and second throttle plates 1600 and 1700. For example, a width between the mating tabs 1653 and 1654 can be about $W_1$, and a width between the mating tabs 1751 and 1752 can be about $W_2$, where $W_2$ is less than $W_1$. Accordingly, when the throttle plates are installed in corresponding horizontal slots of an enclosure (e.g., the enclosure 1000), and when all of the mating tabs of a particular throttle plate have a maximum width of about $W_T$, the throttle plate can be advanced or shifted horizontally by an amount of about $W-W_T$. In one example, the amount $W-W_T$ can be about equal to the width of one of the through-hole slots in the first or second throttle plate 1600 or 1700.

Figure 18A:
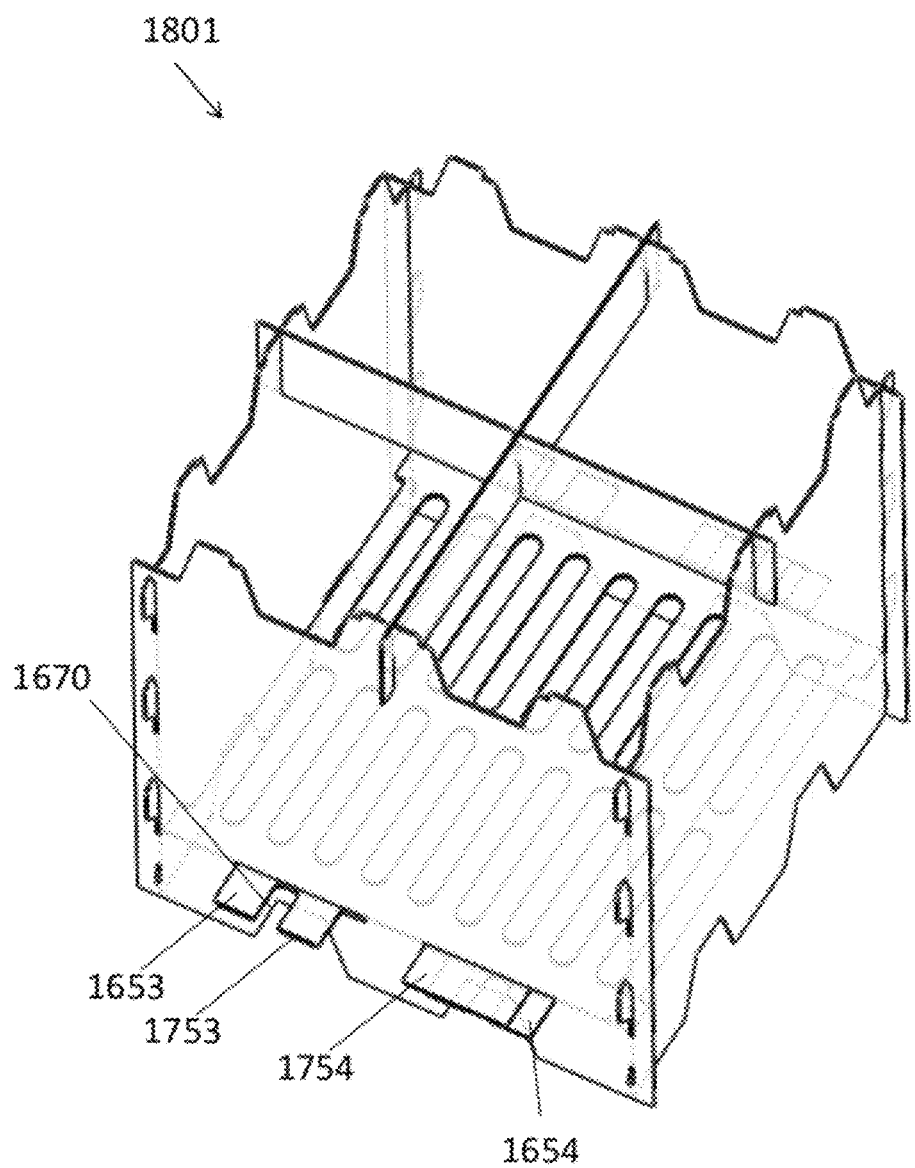
FIG. 18A is a perspective view of an enclosure with an open throttle.

In a first position, the through-hole slots 1661 and 1761 of stacked first and second throttle plates 1600 and 1700 can be substantially aligned, such that each through-hole slot on the first throttle plate 1600 corresponds to a similar through-hole slot on the second throttle plate 1700. In this position, which is illustrated in FIG. 18A, the throttle is "open" and air is free to move through the stacked first and second throttle plates 1600 and 1700. In the first position, the throttle status indicator 1670 can visually indicate that the throttle is open because the indicator can be substantially aligned with a corresponding indicator on the second throttle plate 1700, such as to form a through-hole that is outside of the enclosure and visible to the user.

Figure 18B:
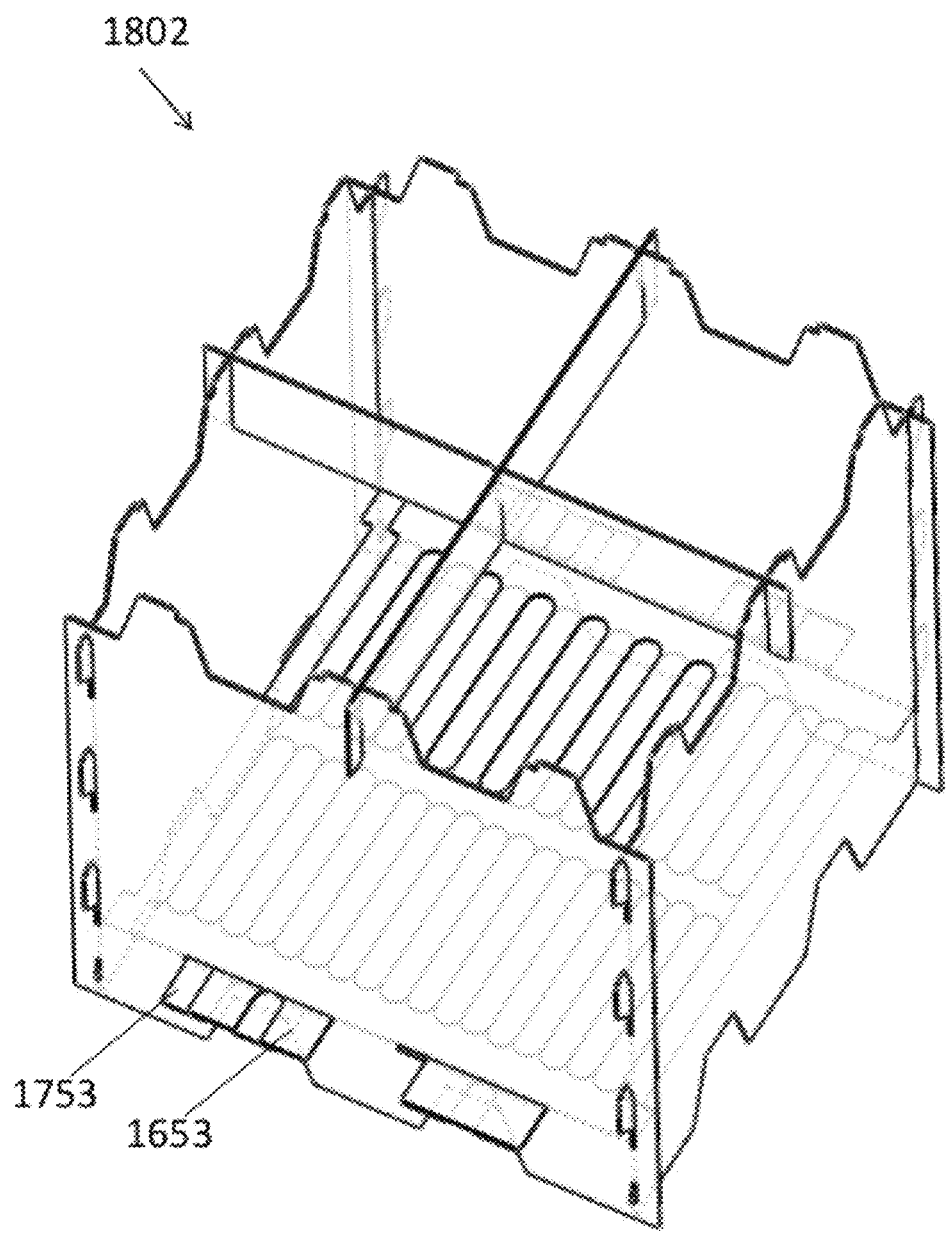
FIG. 18B is a perspective view of an enclosure with a closed throttle.

In a second position, the through-hole slots 1661 of the first throttle plate 1600 can be substantially aligned with a solid planar surface on the second throttle plate 1700. In this position, which is illustrated in FIG. 18B, the throttle is "closed" and air is substantially impeded from moving through the stacked first and second throttle plates 1600 and 1700. In the second position, the throttle status indicator 1670 can visually indicate that the throttle is closed because an open portion of the indicator on the first throttle plate 1600 can be aligned with a solid surface of the second throttle plate 1700.

Figure 18C:
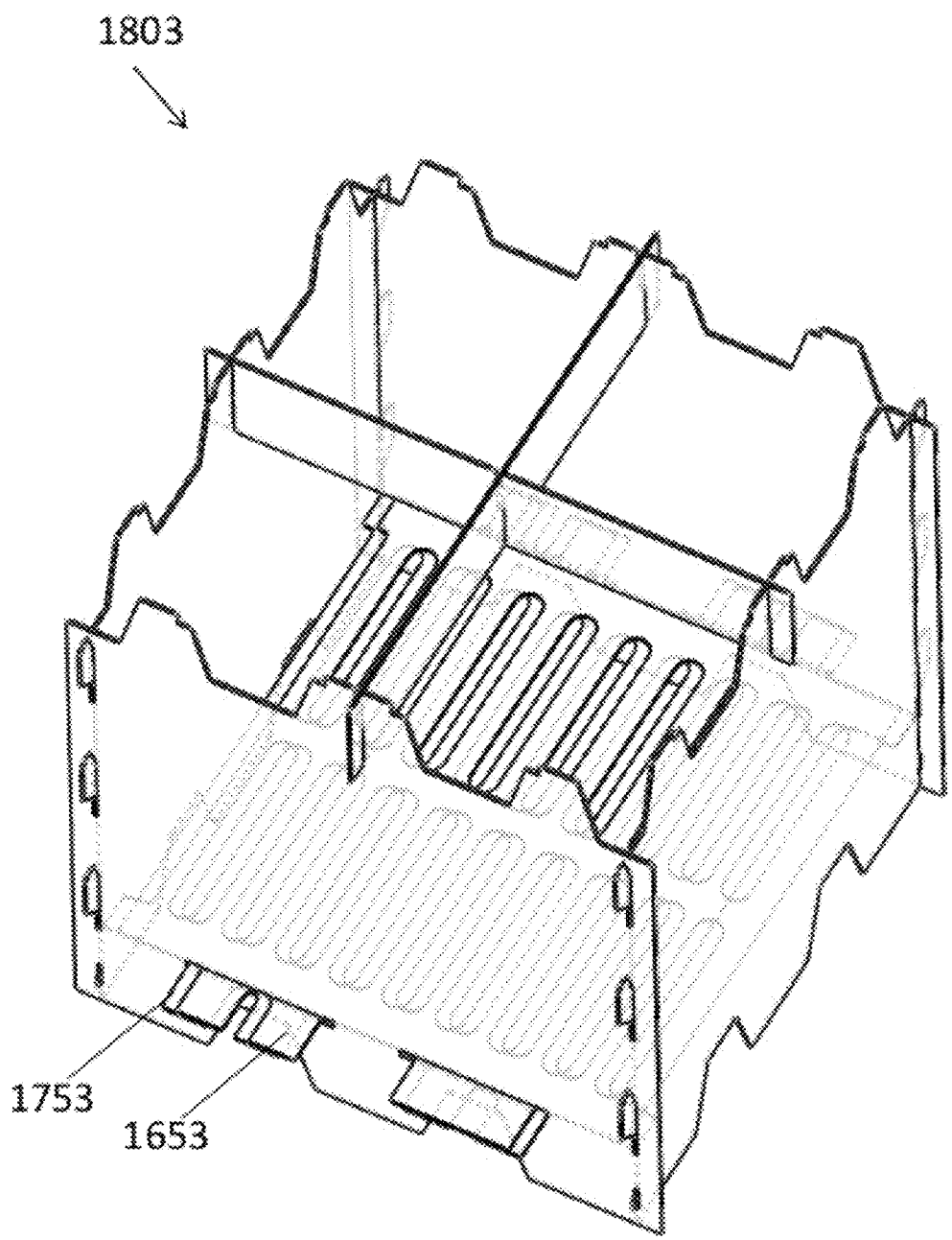
FIG. 18C is a perspective view of an enclosure with a partially-closed throttle.

In a third position, the through-hole slots 1661 and 1761 of the stacked throttle plates can be partially aligned, such that each through-hole slot on the first throttle plate 1600 at least partially corresponds to a similar through-hole slot on the second throttle plate 1700. This position is illustrated in FIG. 18C. The user can adjust how far open or closed the throttle is, such as during use, by sliding one of the mating tabs (e.g., the mating tab 1752 or 1754, among others) on one of the throttle plates relative to the other throttle plate. In the third position, the throttle status indicator 1670 can visually indicate that the throttle is in an intermediate position because a portion of the indicator on the first throttle plate 1600 can be aligned with a portion of the indicator on the second throttle plate 1700, such as illustrated in FIG. 18C. Using the first, second, and third positions, airflow into or out of the enclosure (e.g., the enclosure 1000 having the first and second throttle plates 1600 and 1700 instead of or in addition to the cross plate 800*a*) can be substantially controlled by a user, such as to control combustion of a fuel source disposed on the throttle plates.

Figure 19:
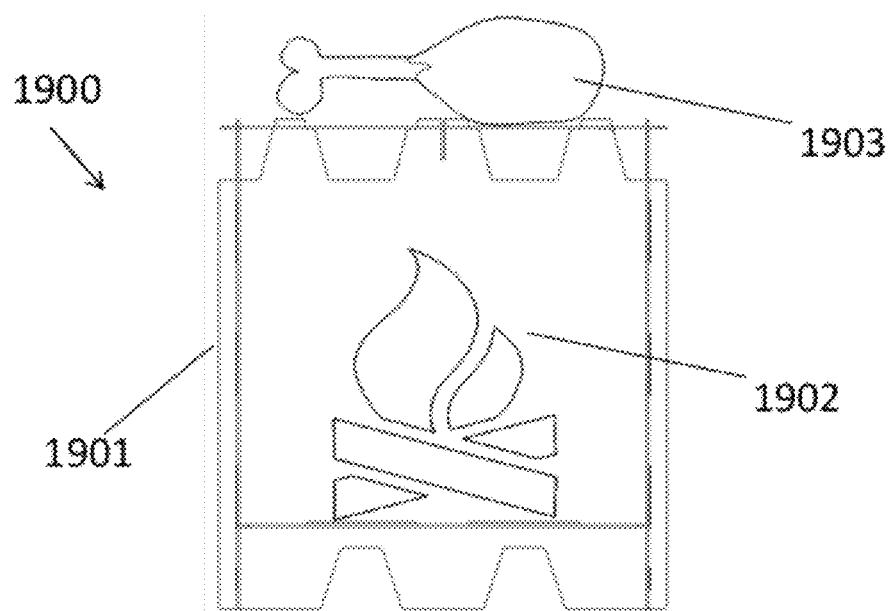
FIG. 19 is a side view of an enclosure configured for use as a stove or grill.
Figure 20:
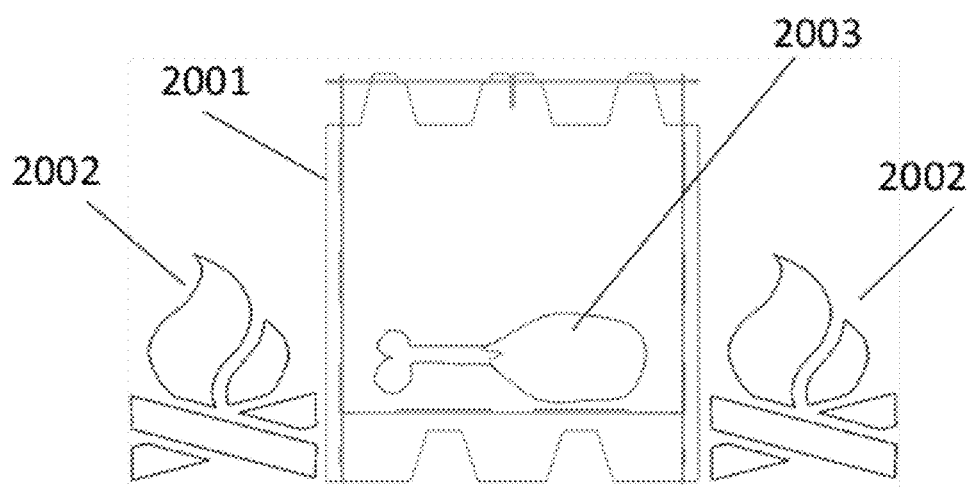
FIG. 20 is a side view of an enclosure configured for use as an oven.

The example fire-resistant collapsible enclosures described above can be used in various ways. For example, FIG. 19 illustrates generally an example of a first configuration wherein a fire-resistant collapsible enclosure 1901 can be used as a stove. A fuel source 1902 can be disposed inside of the enclosure 1901, and an object to be heated 1903, such as food, can be disposed on top of the enclosure 1901. FIG. 20 illustrates generally an example of a second configuration wherein afire-resistant collapsible enclosure 2001 can be used as an oven. A fuel source 2002 can be disposed around or near the enclosure 2001, and an object to be heated 2003, such as food, can be disposed on top of or inside of the enclosure 2001.

Figure 21:
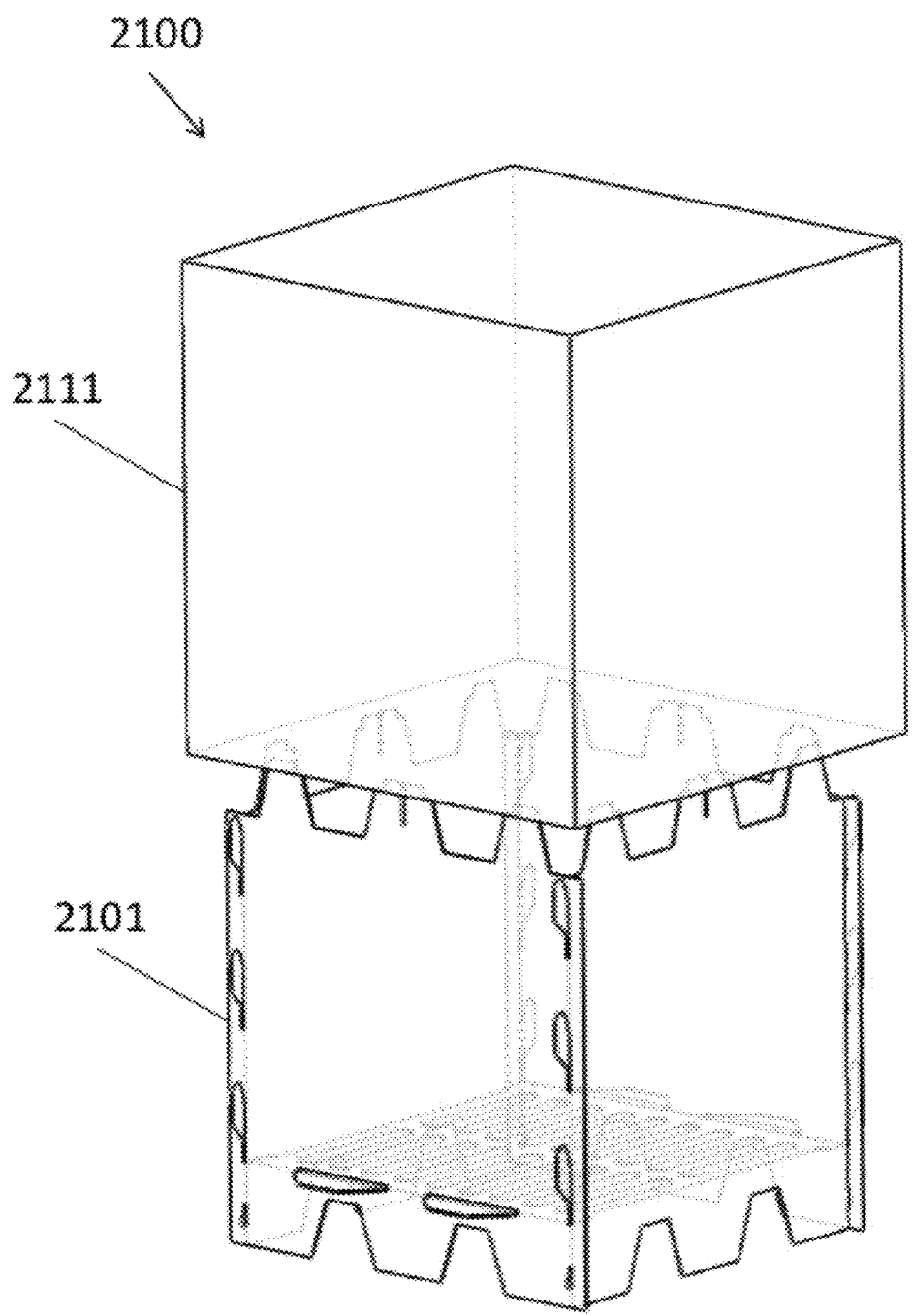
FIG. 21 is a perspective view of coupled first and second enclosures.

In another example, one or more fire-resistant collapsible enclosures, such as described above, can be used together. For example, FIG. 21 illustrates generally an example that includes first and second enclosures. A first enclosure 2101 can be used as a heat or smoke source. A fuel source can be contained within the first enclosure 2101. A second enclosure 2111 can be disposed on top of, or can be physically coupled with, the first enclosure 2101. In this configuration, food or other objects disposed inside of or on top of the second enclosure 2111 can be "smoked" or otherwise heated or prepared. In an example, the first enclosure 2101 can include one or more features in the top portions of the side plates that can be configured to mate with corresponding features in the bottom portions of the side plates of the second enclosure 2111. In one example, the first and second enclosures 2101 and 2111 can be comprised of side plates, cross plates, or top plates, among other elements, each having similar dimensions or characteristics. That is, the first enclosure 2101 can be an enclosure according to the description of the enclosure 1000, and the second enclosure 2111 can be a second enclosure also according to the description of the enclosure 1000. In one example, the first and second enclosures 2101 and 2111 can have different numbers of sidewalls. That is, the first enclosure 2101 can be a four-sided enclosure (e.g., the enclosure 1000), and the second enclosure 2111 can be a three-sided enclosure (e.g., the enclosure 300). Additional enclosures can be stacked, such as on top of the second enclosure 2111.

The enclosures described herein comprise generally one or more side plates (e.g., the first side plate 100, the first male side plate 600*a*, the first female side plate 700*a*, etc.), cross plates, top plates or grates, spanning members, or other substantially planar elements. Any one or more of the plates or members can be made from various materials, and not all of the plates or members of a particular enclosure need to be made from the same materials. In some examples, the plates or members can be made from various metals, including stainless steel (e.g., alloy 304), copper, or aluminum. The plates or members can optionally comprise plated or coated metals or other materials. In some examples, the plates or members can be ceramic, or can be some combination of metal and ceramic. In some examples, the plates or members can include a non-stick or other common cooking surface finish. The plates or members can be generally of a uniform thickness (e.g., about 0.030 inches), but some plates or members can be thicker or thinner than others. In an example, the plates or members can comprise a material that is dimensionally and oxidatively stable over multiple heating and cooling cycles. A heating and cooling cycle can include a temperature change from about zero degrees Celsius to at least about 500 degrees Celsius over a period of at least several seconds.

In one example, a fire-resistant collapsible oven assembly can comprise at least three independent sidewall plates. The sidewall plates can include coupling features disposed along side portions thereof, and a portion of the coupling features in one of the sidewall plates can be configured to engage with a corresponding portion of the coupling features in a second adjoining sidewall plate. The assembly can further comprise a food-safe lower plate, configured to be coupled with the sidewall plates and oriented substantially orthogonally to the sidewall plates. In one example, the sidewall plates and lower plate can be configured to form an internal oven chamber. In one example, the collapsible oven can be configured to be disposed adjacent or proximal to a heat source such that a direct flame is prevented from contacting contents of the internal chamber.

In one example, a fire-resistant collapsible enclosure can include a pair of male side plates and a pair of female side plates. Each of the male side plates can include a slot that extends vertically downward from a central section of a top edge of each plate. Each of the female side plates can include a slot that extends vertically downward from a central section of a top edge of each plate. The slots can be configured to receive a cross member, such as the cross member 1350 illustrated in FIG. 13C. In an example, the cross member can include first and second spanning members. The first spanning member can include a substantially rectangular spanning member having first and second horizontal edges and first and second vertical edges, a first pair of slots, and a third slot. The first pair of slots can be disposed adjacent the vertical edges of the first spanning member and extend inward from the first horizontal edge. The third slot can be disposed in a central portion of the first spanning member and extend inward from the first horizontal edge. The second spanning member can include a second substantially rectangular spanning member having third and fourth horizontal edges and third and fourth vertical edges, a second pair of slots, and a fourth slot. The second pair of slots can be disposed adjacent the vertical edges of the second spanning member and extend inward from the third horizontal edge. The fourth slot can be disposed in a central portion of the second spanning member and extend inward from the fourth horizontal edge. The first slots in the male side plates can be configured to receive one of the first pair of slots of the first spanning member or the second pair of slots of the second spanning member. The second slots in the female side plates can be configured to receive the other of the first pair of slots of the first spanning member or the second pair of slots of the second spanning member. The third and fourth slots can be configured to engage with each other.

The preceding description has been presented only to illustrate and describe example embodiments of invention. The description is not intended to be exhaustive or to limit the invention to any precise form disclosed. Many modifications and variations are possible in light of the above teaching. For example, any physical dimensions identified in the description or the figures are provided as example only, and can be scaled or otherwise adjusted to make a smaller or larger component or unit.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

What is claimed is:

1. A collapsible portable cooking stove comprising:
a pair of substantially rectangular first side plates, each first side plate comprising:
a port configured to allow airflow and combustion, the port extending from a top edge of the first side plate toward a bottom edge of the first side plate, the bottom edge being opposite the top edge;
a mating tab extending from a side edge of each first side plate, the mating tab extending laterally away and along the side edge in a first direction to form a tab slot having a bottom; and
a locking tab having a bottom surface extending continuously and laterally away from and along the side edge to a tip and in a second direction opposite the first direction; and
a pair of substantially rectangular second side plates, each second side plate comprising:
a mating slot disposed near a side edge of each second side plate and configured to receive the mating tab of one of the pair of first side plates for engagement, the mating slot being positioned on each second side plate such that a top of the mating slot is aligned with the bottom of the tab slot when one of the pair of second side plate is engaged and horizontally aligned with one of the pair of first side plates; and
a locking slot configured to engage the bottom side of the locking tab of one of the pair of first side plates to form a force-fit interaction, the locking slot being positioned on each second side plate such that a bottom of the locking slot is slightly above the tip of the locking tab when one of the pair of second side plates is engaged and horizontally aligned with one of the pair of first side plates;
wherein:
engagement of the locking slot and the locking tab deforms the locking tab or stretches the side edge of one of the second side plates to allow the bottom of the locking slot to slip over the tip of the locking tab;
engagement of the locking slot and the locking tab opposes shifting motion in the first direction by the pair of second side plates relative to the pair of first side plates thereby allowing application of a lifting force to the pair of second side plates without disengaging the pair of second side plates; and
the first and second side plates are collapsible and stackable into a substantially flat configuration by disengaging the locking slot and tab and shifting the pair of second side plates relative to the pair of first side plates.

2. A heating apparatus, comprising:
a fire-resistant collapsible enclosure comprising:
a plurality of substantially vertical sidewalls having an assembled position defining an outer perimeter of the apparatus and an enclosure volume;
each sidewall including:
a bottom edge having a plurality of extensions protruding therefrom configured to support the sidewall and form an airflow inlet between the plurality of extensions defining an inlet area; and
a top edge having an extension protruding therefrom, the extension of the top edge comprising:
a slot configured to receive a cross member; and
a recess configured to support a grate;
wherein a sidewall of the plurality of sidewalls comprises a side edge having:
a mating tab extending along and laterally away from the side edge in a first direction; and
a locking tab having a bottom surface extending continuously and laterally away from the side edge in a second direction opposite the first direction;
wherein another sidewall of the plurality of sidewalls comprises:
a mating slot configured to receive the mating tab of the sidewall for engagement; and
a locking slot configured to engage the bottom side of the locking tab of the sidewall to form a force-fit interaction;
wherein the extensions of the top edge form a plurality of airflow ports defining an outlet area;
a first cross plate coupled with the substantially vertical sidewalls at an intermediate location between the top and bottom support portions and configured for supporting a fuel above the airflow ports;
a second cross plate coupled with the substantially vertical sidewalls and arranged above the airflow ports;
wherein the airflow ports are in fluid communication and are configured to allow airflow through the enclosure; and
wherein a ratio of a port area to the enclosure volume can be readjusted by blocking all or a portion of the plurality of airflow ports.

3. The apparatus of claim 2 wherein one of the substantially vertical sidewalls includes a bottom support portion and a top support portion.

4. The apparatus of claim 2, wherein the apparatus has three substantially vertical sidewalls, each vertical sidewall being comprised of substantially rectangular planar side plate.

5. The apparatus of claim 4, wherein each of the three substantially rectangular planar side plates has opposing first and second side portions at substantially vertical side edges;
wherein each of the three substantially planar side plates includes a first coupling feature disposed in the first side portion and a second coupling feature disposed in the second side portion;
wherein the first coupling feature of a first one of the three side plates in configured to mechanically couple with a corresponding second coupling feature of an adjoining one of the three side plates; and
wherein the first coupling feature of the first one of the three side plates and the second coupling feature of the adjoining one of the three side plates are configured to be engaged and secured when the side plates are laterally shifted relative to one another.

6. The apparatus of claim 2, wherein the second cross plate is configured to engage with an edge of the top support portion, and wherein the top support portion includes an extension configured to be received in a mating feature that is disposed along an edge of the second cross plate.

7. The apparatus of claim 2, wherein the first cross plate or the second cross plate comprises a food-safe surface, and wherein the sidewalls, the first cross plate, and the second cross plate comprise a material that is dimensionally and oxidatively stable over multiple heating and cooling cycles, wherein a heating and cooling cycle includes a temperature change from about zero degrees Celsius to at least about 500 degree Celsius over a period of several seconds.

8. The apparatus of claim 2, wherein a total mass of sidewalls, first cross plate, and second cross plate, is less than 2.5 pounds.

9. The apparatus of claim 2, wherein each of the first cross plate and the second cross plate comprises multiple cutouts such that the first cross plate and the second cross plate each comprise about 30 percent open area.

10. The apparatus of claim 9, further comprising a throttle plate, the throttle plate comprising multiple cutouts corresponding to the cutouts of the first cross plate, wherein the throttle plate is movably engaged with the first cross plate along corresponding planar faces such that a total open area of a combination of the throttle plate and the first cross plate is continuously variable between a substantially open configuration and substantially closed configuration.

11. The apparatus of claim 2, further comprising a cross member supported by the top support portion.

12. The apparatus of claim 2, further comprising a smoker box configured to be mechanically coupled to the top support portion.

13. The apparatus of claim 2, wherein the substantially vertical side plates include:

first and second substantially rectangular planar male sides plates, each of the male side plates including male coupling feature disposed adjacent each of two opposing side edges; and first and second rectangular planar female side plates, each of the female side plates including a female couple feature disposed adjacent each of two opposing side edges;

wherein male and female couple features are configured to correspondingly engage.

14. The apparatus of claim 2, wherein the type of airflow ratio is adjusted depending upon the type of fuel, weather conditions, and possible uneven terrain.

15. The apparatus of claim 2, wherein the ration of the inlet area to the enclosure volume ranges from approximately 0.28 to approximately 0.44.

16. The apparatus of claim 2, wherein the ratio of the outlet area to the enclosure volume ranges from approximately 0.46 to approximately 0.07.

* * * * *